United States Patent
Pietropaolo et al.

(10) Patent No.: US 6,351,765 B1
(45) Date of Patent: *Feb. 26, 2002

(54) NONLINEAR VIDEO EDITING SYSTEM

(75) Inventors: Suzanne Marie Pietropaolo, Carlisle; Phillip T. DiBello, Billerica; Anthony M. Scotto, Jr., Acton, all of MA (US)

(73) Assignee: Media 100, Inc., Marlboro, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/037,310

(22) Filed: Mar. 9, 1998

(51) Int. Cl.[7] .............................. G06F 15/16; G06F 3/00; H04N 5/222
(52) U.S. Cl. ...................... 709/218; 345/328; 348/722
(58) Field of Search ............................... 709/217, 218; 345/328; 348/722, 9

(56) References Cited

U.S. PATENT DOCUMENTS

| | | | |
|---|---|---|---|
| 4,599,689 A | 7/1986 | Berman | 364/200 |
| 4,703,449 A | 10/1987 | Berman | 364/900 |
| 4,916,531 A | 4/1990 | Genz | 358/75 |
| 5,111,203 A | 5/1992 | Calkins | 341/141 |
| 5,168,247 A | 12/1992 | Tarr | 331/111 |
| 5,185,883 A | 2/1993 | Ianni | 395/575 |
| 5,267,351 A | 11/1993 | Reber et al. | 395/600 |
| 5,388,197 A * | 2/1995 | Rayner | 395/328 |
| 5,406,311 A | 4/1995 | Michelson | 345/200 |
| 5,471,577 A | 11/1995 | Lightbody et al. | 395/157 |
| 5,488,695 A | 1/1996 | Cutter | 395/290 |
| 5,506,932 A | 4/1996 | Holmes et al. | 395/2.14 |
| 5,568,275 A * | 10/1996 | Norton et al. | 386/52 |
| 5,584,006 A | 12/1996 | Reber et al. | 395/427 |
| 5,628,028 A | 5/1997 | Michelson | 395/828 |
| 5,684,963 A | 11/1997 | Clement | 395/226 |
| 5,706,451 A | 1/1998 | Lightbody et al. | 395/327 |
| 5,748,842 A | 5/1998 | Holmes et al. | 395/2.79 |
| 5,835,667 A * | 11/1998 | Wactlar et al. | 386/96 |
| 5,905,842 A * | 5/1999 | Kajimoto | 386/52 |

* cited by examiner

Primary Examiner—John W. Miller
(74) Attorney, Agent, or Firm—Fish & Richardson, P.C.

(57) ABSTRACT

An apparatus is provided for editing video which has at least two components: a digital database system and a nonlinear video editor. The digital database system stores source video segments and has the capability to decimate the source video segments into decimated video segments of a selected decimation quality. The nonlinear video editor is connected to selectively access decimated video segments and source video segments from the digital database system. The nonlinear video editor is capable of using the decimated video segments during editing of a video program and accessing the source video segments to produce the program at a different quality than the selected video.

88 Claims, 16 Drawing Sheets

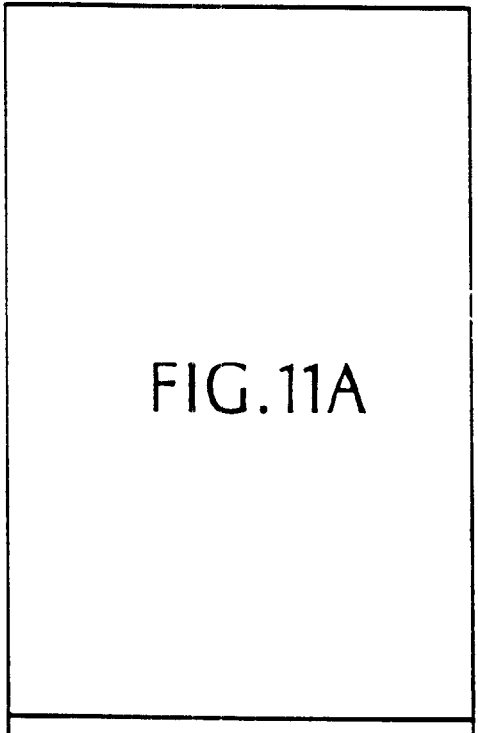
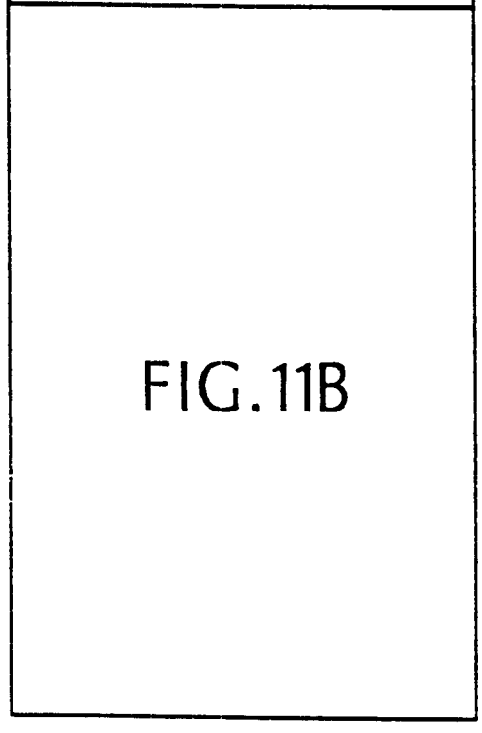
FIG.11

NONLINEAR VIDEO EDITING SYSTEM

BACKGROUND OF THE INVENTION

The invention relates to editing video on a nonlinear video editing system.

Nonlinear video editing systems typically receive analog or digital video from a video tape recorder, digitize and compress the video, and store the compressed digital video on local storage for random access during creation and assembling of a video program. The stored digital video data available to such systems are typically limited by the amount of available local storage.

SUMMARY OF THE INVENTION

In one general aspect, the invention features an apparatus for editing video which has at least two components: a digital database system and a nonlinear video editor. The digital database system stores source video segments and has the capability to decimate the source video segments into decimated video segments of a selected decimation quality. The nonlinear video editor is connected so as to selectively access decimated video segments and source video segments from the digital database system. The nonlinear video editor is capable of using the decimated video segments during editing of a program and then producing the program.

In another general aspect, the invention features an apparatus for editing video which has at least two components: a remote digital database system storing remote source video segments and a local nonlinear video editor. Both of these components are configured for connection to a network. The local nonlinear video editor has local storage for local source video segments and the capability to access the remote source video segments from the digital database system. The local nonlinear video editor also displays video segment identifiers for the segments being included in a video program, the identifiers indicating whether the video segments included in the program are remote source video segments or local source video segments.

In yet another general aspect, the invention features an apparatus for editing video which has at least two components: a remote digital database system storing remote source video segments and a local nonlinear video editor. Both of these components are configured for connection to a network. The nonlinear video editor has local storage for local source video segments and the ability to access the remote source video segments from the digital database system. The nonlinear video editor displays video segment identifiers for video segments being included in a video program substantially simultaneously with displaying a search mechanism for searching the remote source video segments for selection for inclusion in the program.

In still another aspect, the invention features an apparatus for editing video which has at least two components: a remote digital database system storing source video segments and a local nonlinear video editor. The digital database system and nonlinear video editor are connected to a network. The local nonlinear video editor is connected so as to selectively access the source video segments from the digital database system by transmitting over the network information identifying the selected source video segment to the digital database manager. The database system, in response, transmits over the same network the selected source video segment to the nonlinear video editor.

In yet another general aspect, the invention features an apparatus including a digital database system and a nonlinear media editor. The digital database system which stores source audio segments and has the capability to resample, at a selected resampled quality, the stored audio segments into resampled audio segments. The nonlinear media editor, which may be a nonlinear video and/or audio editor, is connected so as to selectively access the resampled audio segments and source audio segments from the digital database system and is capable of using the resampled audio segments during editing of a media program and producing the media program.

In another general aspect, the invention features an apparatus for editing video including a remote digital database system and a local computer, being configured for connection to the network, and operating a nonlinear video editing application. The remote digital database system stores source video segments and is configured for connection to a network. The nonlinear video editing application is capable of supplying the remote digital database system with a selected criterion for searching the digital database system and using results of the search during editing and producing of the program.

Certain implementations of the invention include one or more of the following features.

A user searches the digital database system to find source audio and video segments which the user then may use in editing a video program. The user is provided with various displays for inputting the search criteria to be used for searching the digital database, reviewing and importing audio and video segments found during the search, and editing of a video program incorporating some of those found audio and video segments.

The nonlinear video editor displays video segment identifiers in a video program editing region (e.g., a graphical user interface window), where the video program editing region is used for editing the program. The program editing region may include a video time line indicator. The nonlinear video editor can use one or more channels of video and display video segment tracks in the program editing region corresponding to those channels of video. The nonlinear video editor can also use one or more channels of audio and display audio segment tracks in the program editing region corresponding to those channels of audio.

The nonlinear video editor displays a digital database system selection region (e.g., a graphical user interface window) for selecting a digital system from among a plurality of digital database systems.

The nonlinear video editor displays a database search region (e.g., a graphical user interface window) for inputting search criteria for searching the digital database system and displaying a search result indicator. The search result indicator can include an indication of the number of source video segments, stored on the digital database system, which were found during the search.

The nonlinear video editor displays a found remote source video segments region (e.g., a graphical user interface window) for displaying video segment indicators for remote source video segments found in a search performed by the digital database system. A video identifier can be a frame from a corresponding found remote source video segment found in the search.

The results (e.g. segment identifiers for video segments found in the search) of a search performed by the digital database system may be imported from the digital database system into the nonlinear video editor and placed in a bin. Also, a source video segment found in a search may be sent by the digital database system to the nonlinear video editor and be incorporated directly in a video program, for example, at a pre-selected point in the time line of the program.

Prior to transmitting a found video segment, the video segment may be decimated and the user may use the decimated video segment to edit the video program. The digital database system therefore may include a decimation module for decimating the decompressed video segment. Decimating the source video segments includes at least one of temporally decimating, spatially decimating, or compressing the source video segments.

The digital database system transfers decimated video segments over the network, at a requested decimation quality, to the nonlinear video editor, for example, after performing a search. Note that a decimation quality includes a quality of a non-decimated video. The nonlinear video editor receives the decimated video segment and represents the decimated video in the bin or represents the decimated video segment on a time line of the program on the display (or in a video program editing region on the display).

The user can edit a video program using the decimated video segments. The nonlinear video editor is capable of editing a plurality of source video segments some of which are stored on a remote digital database system and some of which are stored on the local computer on which the nonlinear video editor is implemented. The nonlinear video may visually represent those source video segments which are stored on the remote digital database system differently than those stored on the local computer. For example the nonlinear video may represent the source video segments stored on the digital database system by a different color or symbol on the display of the nonlinear video editor than the source video segment stored on the local computer.

During editing the program, the nonlinear video editor produces a list of commands and uses the list of commands to produce the final program using local and remote source video segments. After editing and during producing the video program, the nonlinear editor accesses the source video segments (whether local or remote) and produces the finalized video program.

As part of accessing the source video segments, the nonlinear video editor is capable of selecting a portion of a decimated video segment and accessing a portion of the source video segment corresponding to the portion of the decimated video segment. The nonlinear video editor can access a specific portion of the source video segment by transmitting over the network information identifying that portion of the decimated video segment or the corresponding portion of the selected source video segment to the digital database system. Information identifying the desired portion may be a relative video segment start time and a relative video segment end time. The nonlinear editor can transmit these relative start and end times to the digital database system, in which case the digital database system uses them to determine a portion of the source video segment that corresponds to the specific portion requested by the nonlinear video editor. The digital database system then transmits that portion of the source video segment to the nonlinear video editor.

In some implementations, the nonlinear video editor and the digital database system may be implemented on the same computer. In other implementations, the nonlinear video editor may be implemented on a local computer. The digital database system may located in a remote location and store the source video segments remotely. The nonlinear video editor and digital database system may then be connected to a network for communicating with one another.

In some implementations, the communication between the local nonlinear video editor and the remote digital database system take place over the same network. That is, for example, instead of two networks, where one is used for video data and the other is used for control data, the same network is used for transmitting both types of data. The network may be characterized by, for example, being implemented by a collection of data lines and network components for transmitting both video and control data, where the same data lines and network components may be used by the local nonlinear video editor and remote digital database system to transmit both video and control data.

The remote digital database system may store remote source audio segments remotely and the local nonlinear video editor may have local storage for local source audio segments and the ability to access the remote source audio segments from the digital database system. The local nonlinear video editor may display on the display audio segment identifiers for audio segments being included in a video program simultaneously with displaying a search mechanism for searching the remote source audio segments for selection for inclusion in the program.

In some implementations, the digital database system which stores source audio segments and has the capability to resample, at a selected resampled quality, the stored audio segments into resampled audio segments. The nonlinear editor, which may be a nonlinear video and/or audio editor, may be capable of accessing all or part of the source audio segments to produce the program at a second selected resampled quality, which may be the same or different than the first-mentioned selected resampled quality.

In certain implementations, the digital database system stores the source video segments as compressed video segments. The digital database system may include a decompression module for decompressing a compressed source video segment.

Embodiments of the invention may include one or more of the following advantages.

By allowing a user of a nonlinear video editor to have access to a remote digital database, the invention allows the user to access large libraries of source audio and video segments (or clips). Therefore, the user need not be limited by the storage capability of the computer running the nonlinear video editor application or by the collection of source video segments present on that computer (or local external storage devices attachable to that computer). Also, many users can have access to a particular library (i.e. database).

Decimating the video prior to transmitting it allows the invention to optimize, in a variety of ways, the process of storing and transmitting video across a network. Decimating the video for transmission allows adjusting the decimation quality to meet the requirements set by user preferences, network limitations, or the nonlinear editor's local limitations. At the same time, in certain circumstances, since the video is decimated prior to transmission, any compression technique used for storing the video segments need not be optimized for transmitting the video across the network but can instead be optimized for optimal storage (e.g. optimized for storing high quality video).

The invention allows using decimated video segments for editing a video program and then retrieving the video segments at a different decimation quality (which includes no decimation at all for the data retrieved for the final program, not for the video segments retrieved for editing, which have a reduced amount of data with respect to the stored video segments) to produce the final program. Therefore, if video segments are to be retrieved at a higher quality, only those video segments that are actually used in the final program need be retrieved. Moreover, the video segment can be retrieved at off-peak times, so as not to overburden the network during peak hours (e.g. 8 am–6 pm). Moreover, the invention allows retrieving only those portions of the video segments that are to be included in the program, rather than retrieving the video segments in their entirety. This further reduces the burden on the network.

The invention allows using the same network for both command and video data. Therefore, no additional network needs to be installed to implement the invention.

DESCRIPTION OF THE PREFERRED EMBODIMENTS

Figure 1:
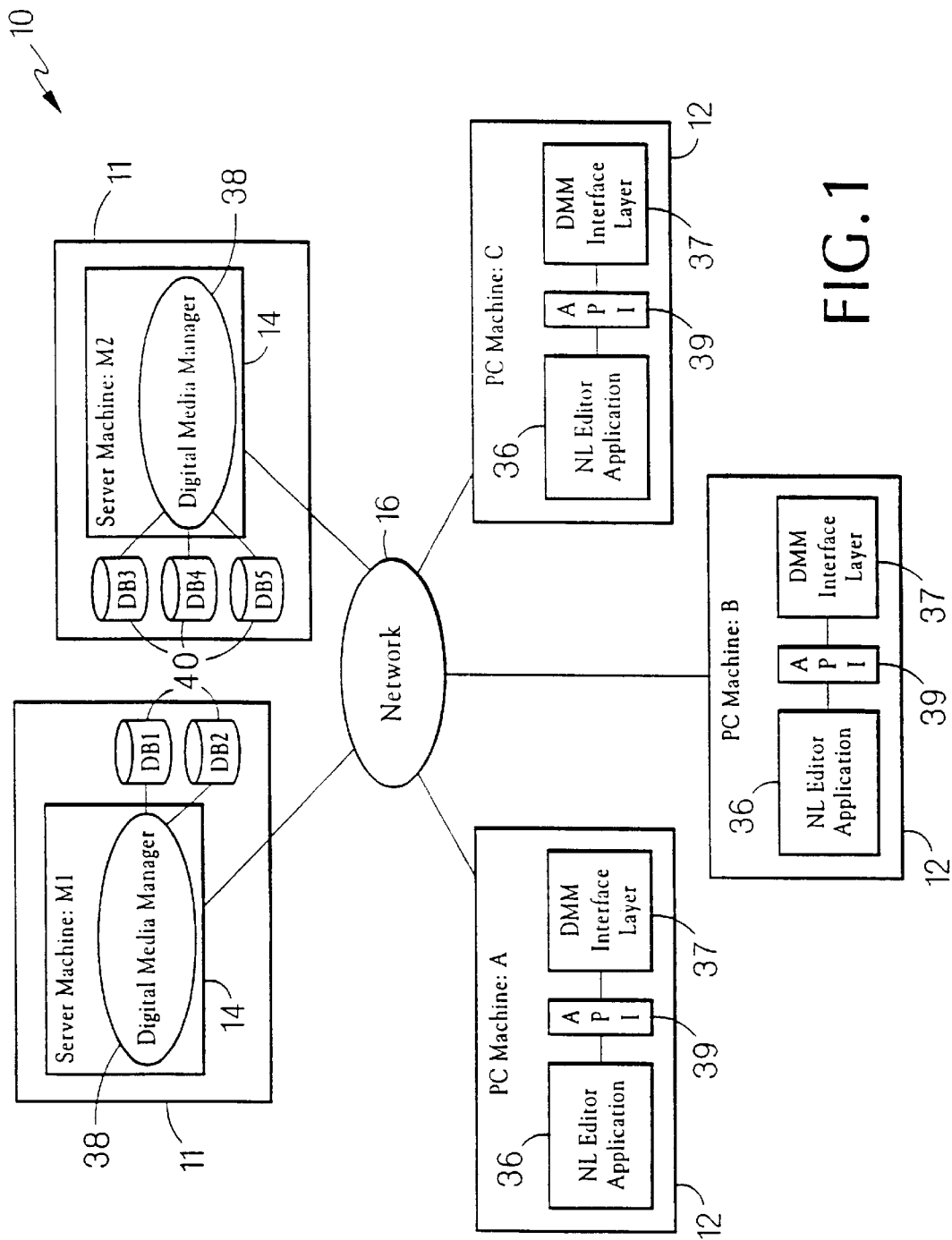
FIG. 1 is a diagram of a system including nonlinear audio and video editors and digital database managers connected to a network.
Figure 2:
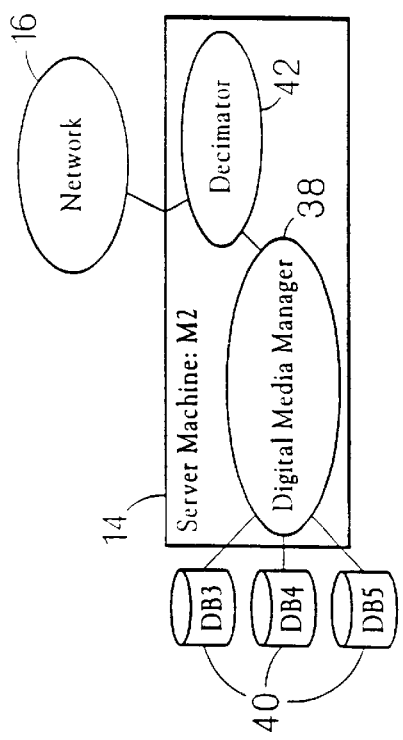
FIG. 2 is a diagram showing a digital database manager of FIG. 1.

Referring to FIGS. 1 and 2, there is shown an audio and video system 10. It includes PC based local nonlinear audio and video editors 12 and remote digital database systems 11 connected to network 16. Various embodiments of audio and video system 10 may have various features. For example, network 16 may be a private local or wide area network or a public network such as the internet. Database managers 14 and their associated databases 40 may be available only privately, e.g. owned by an enterprise (such as a firm, corporation, etc.) and be available only to users of that enterprise. Or, database managers 14 and their associated databases 40 may be commercially available to the public, i.e. owned by an enterprise and be commercially available to users outside of that enterprise who pay a fee to access the data in the databases. Nonlinear audio and video editors 12 are well known and may, for example, be PC based editing systems available under the Media 100 trade designation, generally described in commonly assigned application "Synchronizing Digital and Audio Video", Ser. No. 08/049,987, filed on Mar. 16, 1993, incorporated by reference. Digital database systems 11 include digital database managers 14 which may, for example, be a digital database manager commercially available under the Cinebase, version 1.2 trade designation and databases 40. Digital database managers 14 manage storage media storing databases 40 which store, as digital video and audio data, source audio and video clips of various lengths. This data is typically stored as compressed digital video. In other embodiments, the video is stored without being compressed. In addition, digital database managers 14 may have the video decimation capability described further herein. Briefly, decimation refers to techniques for reducing data used to define video images, often transforming video images from a higher quality to a lower quality, including techniques such as video compression, data compression, subsampling, thumbnailing, etc. Although FIG. 1 shows three nonlinear editors 12 and two database managers 14, the number of nonlinear editors 12 and database managers 14 may vary in various embodiments.

We will describe the structure and operation of audio and video editing system 10 in detail below. However, to provide an overview of the operation of system 10, we will first describe in general terms the operation of the system from the point of view a user of system 10. Generally, such a user uses system 10 to produce audio and video programs of various length by editing and combining digital audio and video clips stored in remote databases 40 and in local storage media of one of nonlinear editors 12. Therefore, system 10 permits the user to use remote databases 40 which can typically store much more data than local storage media of nonlinear editors 12.

Figure 4:
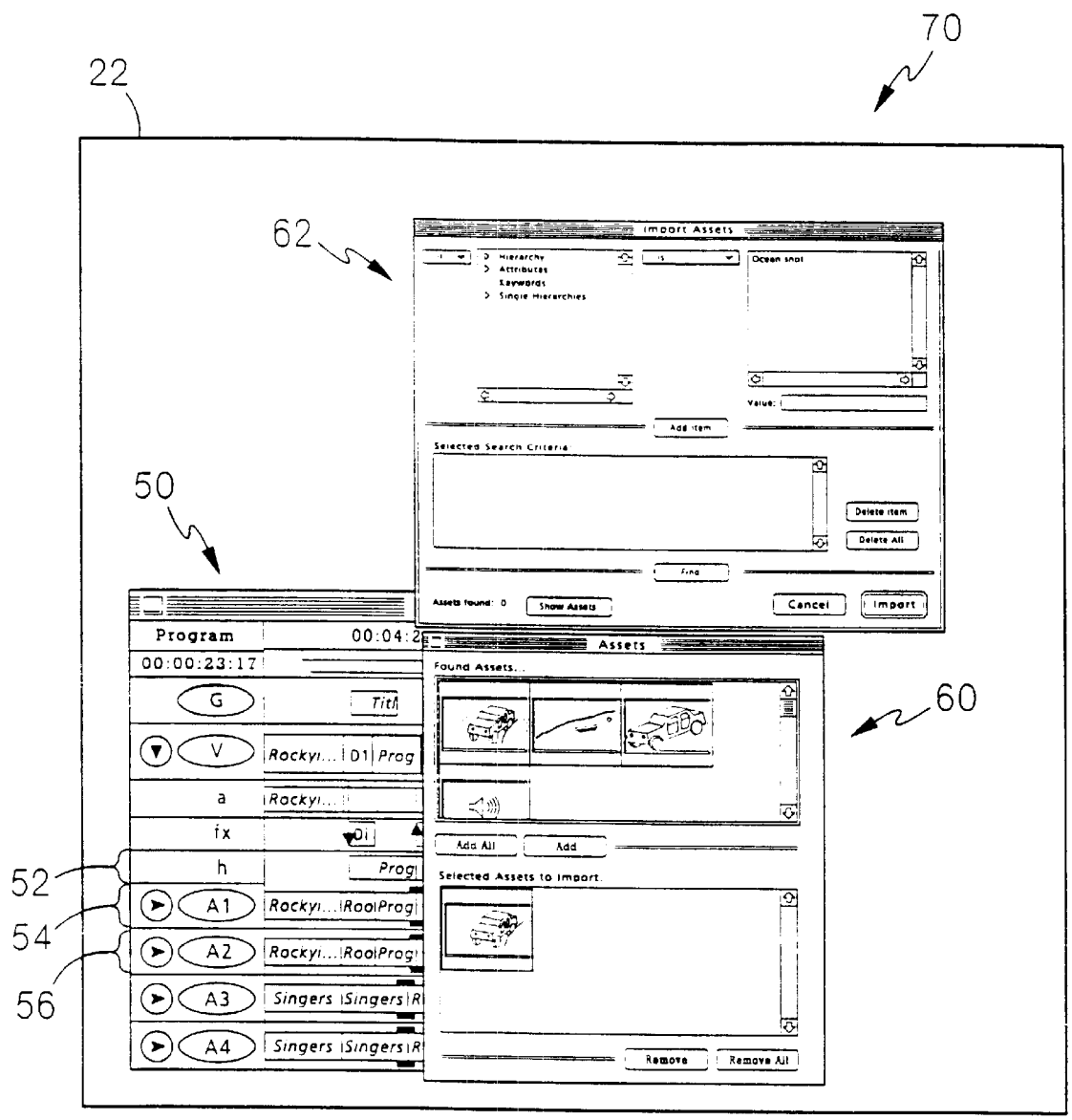
FIG. 4 is a diagram showing a display used during editing on a monitor of the FIG. 3 nonlinear editor.

When creating a program, the user at one nonlinear editor 12 can create a program from locally stored and remotely stored digital audio and video data. The user can use that nonlinear editor to select one of digital database managers 14. The user can then search for audio and video clips in the databases 40 of the selected database manager 14 that would match some criteria which the user inputs into the selected nonlinear editor 12. In other embodiments, the user need not select a specific database manager 14 and can search the databases 40 of all or a selected group of database managers 14 at once. FIG. 4 shows a display 70 on a monitor 22 of nonlinear editor 12, where the display includes a search window 62. The user uses search window 62 (better shown in FIG. 5) to input the criteria to be matched during the search of the selected databases 40. For example, the user may request clips which match key words "1950" and "truck." Nonlinear editor 12 communicates the search request and criteria over network 16 to the selected database manager 14. Database manager 14 then searches its digital databases 40 for clips that match the received search criteria. Database manager 14 then sends a clip identifier for the matching audio and video clips (e.g., in the case of video, a representative frame) over network 16 to nonlinear editor 12.

After receiving the clip identifiers for the matching clips, the user can then select those clips which the user would like to import from databases 40 to possibly use in the program. To do so, the user uses a search result and selection window 60 (shown in display 70 in FIG. 4 and also in FIG. 6) shows the results of search by the selected database manager 14.

Search result and selection window 60 allows the user to select those video and audio clips the user wants to import into the nonlinear editor for possible editing and inclusion in the program.

After selecting which video and audio clips to import, the selected database manager 14 sends those clips over network 16 to the selected nonlinear editor 12. In some embodiments, the selected database manager 14 decimates the video clips prior to sending them over network 16. In that case, after the user has finalized the editing of the program and decides to produce the final program, database managers 14 send the clips at a different quality of decimation or not decimated at all. Moreover, in some embodiments, only portions of any clip that will be included in the final product is sent over network 16 at a different quality of decimation or not decimated at all. In this manner, less bandwidth is required during the editing stage. This allows for optimization of the usage of bandwidth of network 16, for example, by transferring the non-decimated video data during network off-hours.

Following importing of the selected audio and video clips, the user uses a program window 50 (partially shown in display 70 in FIG. 4, better shown in FIG. 7) to edit and include the imported clips into the edited clip.

Having described briefly an overview of the operation of system 10, we will now describe the structure of database managers 14 and nonlinear editors 12. We will then describe in detail the graphical user interfaces (GUI) the user uses to operate nonlinear editors 12. We will then describe the overall operation of system 10 in reference to the operation of one of nonlinear editors 12.

Referring to FIG. 2, it is seen that digital database manager 14 includes a digital media manager 38 connected to network 16 and associated databases 40. The databases 40 store source digital video and audio data. In some embodiments, digital database manager 14 includes a decimator 42 (which can operate in software or hardware) to decimate video accessed from database 40 prior to transmission over network 16, as will be described below. Each clip in database 40 is stored together with an associated record that may contain a number of attributes used for indexing and searching the database, such as subject description, category, length, and date of creation. Database manager 14 uses the user input search criteria to search these associated records to find matching clips.

Figure 2A:
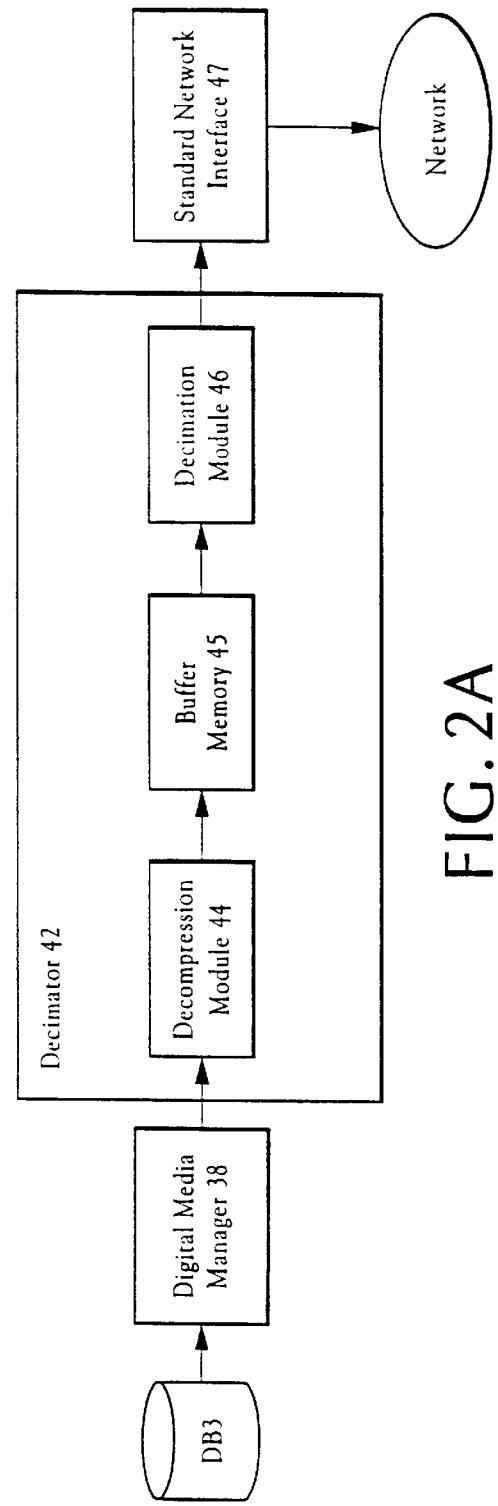
FIG. 2A is a diagram showing the digital database manager of FIG. 2 and components of a decimator of the digital database manager of FIG. 2.

FIG. 2A shows an embodiment of a digital database manager 12 and components of a decimator 42 of that digital database manager 14. In this embodiment, decimator 42 includes a decompression module 44, a buffer memory 45, and a decimation module 46. Buffer memory 45 may be, for example, a line, field, frame, or multi-frame buffer and may be implemented as a FIFO buffer. Decompression module 42 and decimation module 46 are implemented in software. In other embodiments, either one, or both, of these modules may be implemented in hardware or some combination of hardware and software. Buffer memory 45 is formed from a part of the memory of the digital database manager 14. The operation of decimator 42 will be described below in more detail.

The data path from databases 40 via database manager 14 to network 16 is as follows. The digital media manager 38 reads video and audio data and feeds that data to decimator 42. Decompression module 44 of decimator 42 decompresses the data and stores the decompressed data in FIFO buffer memory 45. Decimation module 46 then reads the data from FIFO buffer memory 45, optionally decimates the data, and outputs the data to the standard network interface 47 which sends the data over network 16 to its destination, i.e. one of nonlinear editors 12.

Figure 3:
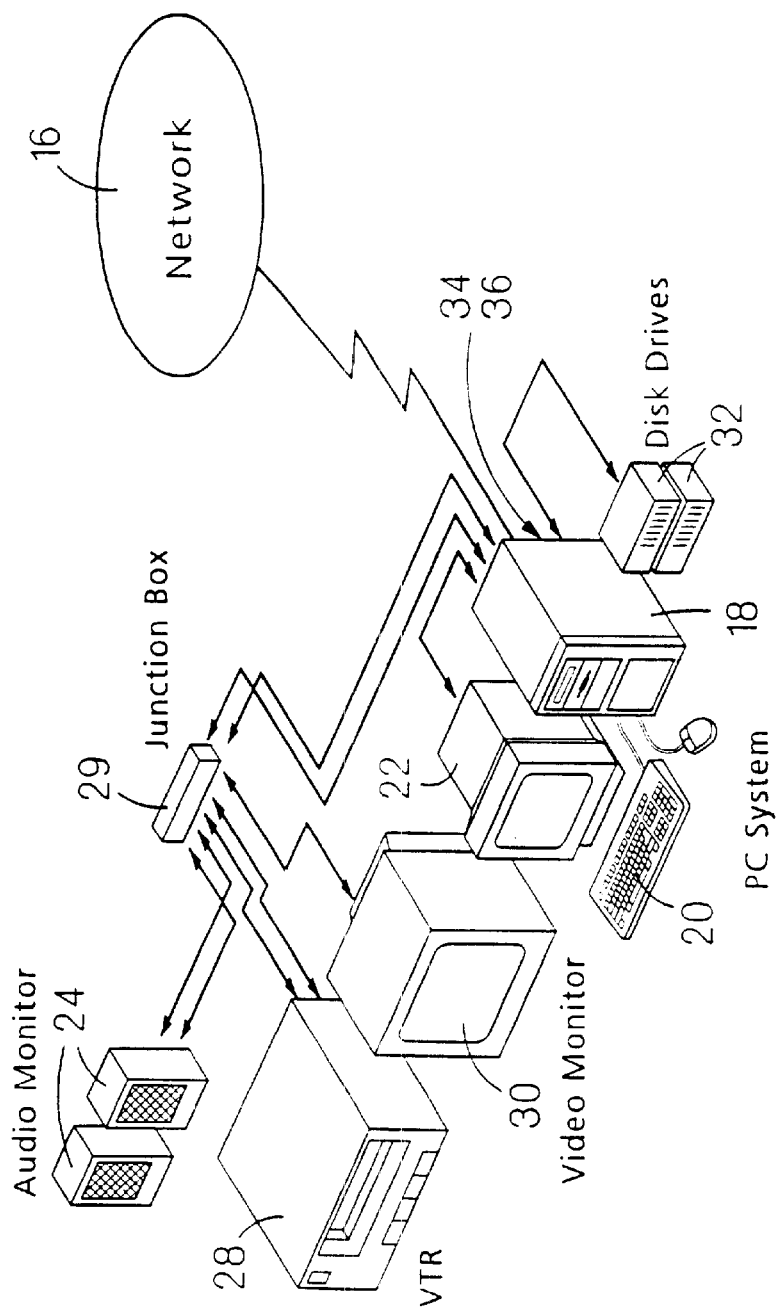
FIG. 3 is a diagram showing the components of a nonlinear video and audio editor of FIG. 1.

Referring to FIG. 3, it is seen that nonlinear video editor 12 includes computer 18 typically having an associated keyboard input device 20, computer monitor 22, and optional speakers 24. VTR 28 and associated playback monitor 30 are also optionally connected to computer 18, via a junction box 29, to input or receive analog audio and video. In some embodiments, local storage of computer 18 includes local external storage devices such as external CD-ROM and disk drives. As shown in FIG. 3, computer 18 is connected to network 16 via a standard network interface 47. Computer 18 has video editing expansion cards 34 connected thereto. Video editing application software 36 is installed on computer 18 (including a portion on expansion cards 34). Computer 18 is connected to local disc storage 32. Nonlinear editor 12 also includes a digital media manager (DMM) interface layer 37 (FIG. 1) which mediates the interaction between the video editing application software 36 and database managers 14. Interface layer 37 communicates with video editing application software 36 through an application programmer interface (API) 39. Interface layer 37 also communicates with database managers 14 across network 16. Furthermore, interface layer 37 provides appropriate user interface displays for a variety of functions, as will be described below.

Application software 36 and interface layer 37 are designed such that they operate as an integrated or single application or software package. Therefore, to a user of the nonlinear video editing application software 36, accessing database managers 14 and searching the databases are transparent, although these functions involve interface layer 37. The user can readily and easily switch between editing a video program and searching for audio and/or video clips to include in that program. In some embodiments, the video editing and database search windows (embodiments of which will be described in detail below with reference to FIGS. 5–9) appear substantially simultaneously (by which we also mean windows which appear alternatively). In those cases, because video editing application software 36 and interface layer 37 act essentially as one program, the user can easily switch between various windows to search the databases and, at the same time, edit and produce the program.

FIG. 4 shows a display 70 on monitor 22. Display 70 includes three graphical user interface (GUI) windows: search window 62, displayed by interface layer 37 (better shown in FIG. 5), which the user uses to input the criteria which the user wants one of the database managers 14 to use to search for audio and video clips in its databases 40; search result and selection window 60, displayed by interface layer 37 (better shown in FIG. 6), which the user uses to select those video and audio clips the user wants to import from database 40 over network 16 to nonlinear editor 12; and program window 50, displayed by editing software 36 (better shown in FIG. 7), in which individual video clips are represented by linear bars 52, 54, 56. Another GUI window is database selection window 64 (shown in FIG. 5A) which the user uses to select one of database managers 14. We will now describe each of these GUI windows in detail.

Figure 5:
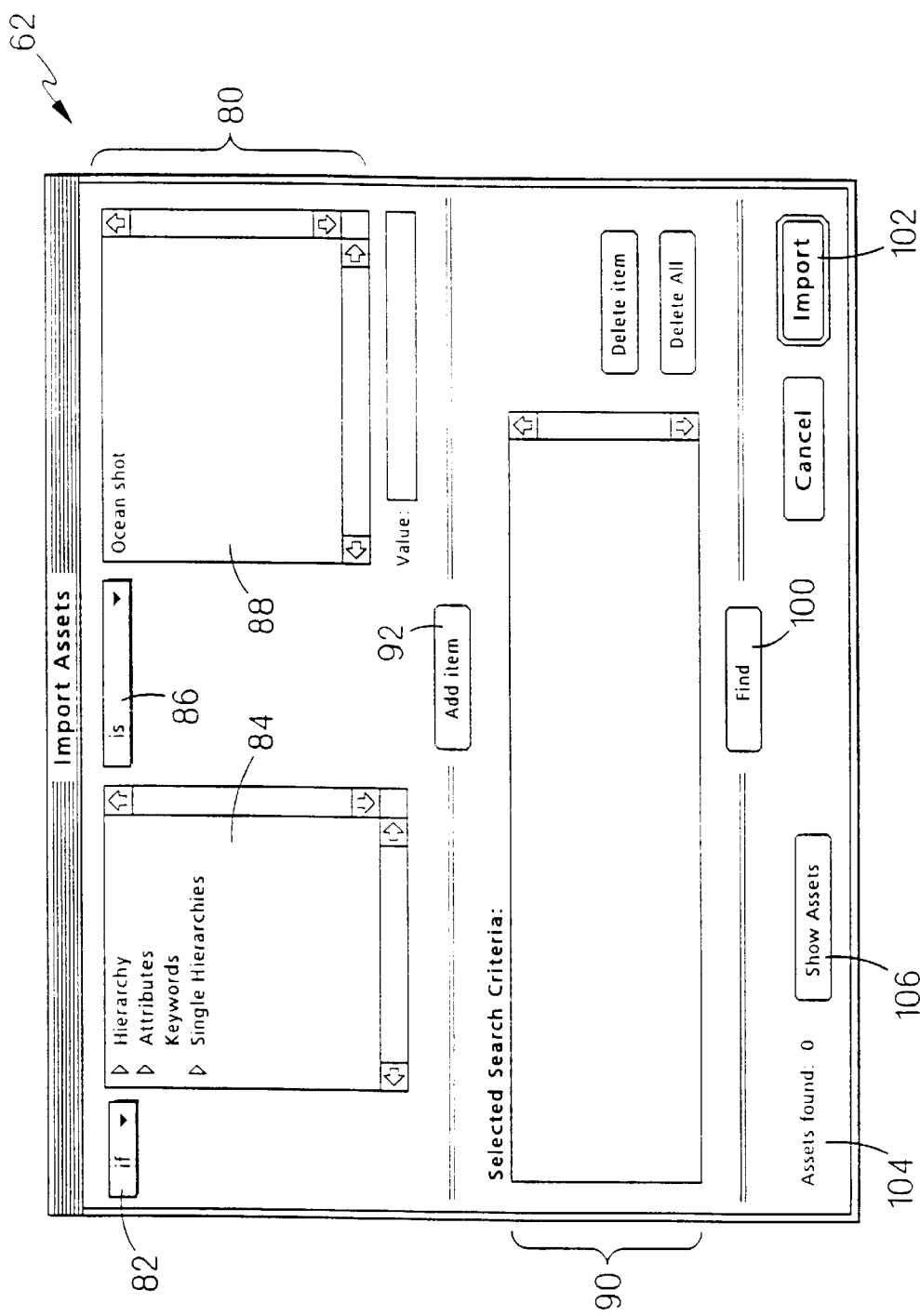
FIG. 5 is a diagram of a graphical user interface window in the display of FIG. 4 for inputting criteria to be used by the digital database manager of FIG. 2 to search its associated databases.
Figure 5A:
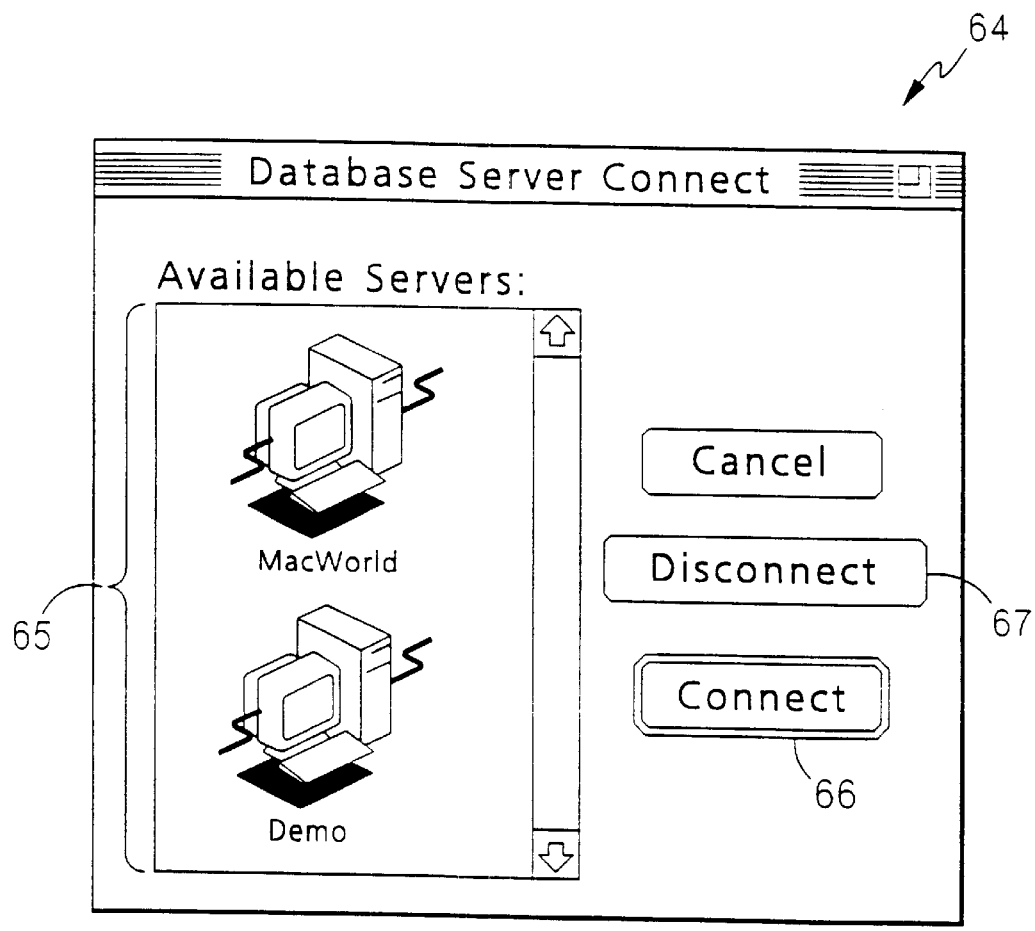
FIG. 5A is a diagram of a graphical user interface window for selecting a digital database manager to be searched.

Referring to FIG. 5A, database selection window 64 allows the user to select a database manager 14 by highlighting a database manager icon representing that database manager in a list 65 of database manager icons and then clicking on connect button 66. (Note that, as is well known in the arts, various features of a GUI window may be "clicked on", i.e. pointed to by a graphic pointer guided by a pointing device such as a mouse and then selected by the user pressing a button of the pointing device. The features that may be clicked on to be manipulated include pull-down menus, buttons, scroll bars, etc.) Similarly, the user can de-select a database manager by highlighting its icon and clicking on disconnect button 67.

Referring to FIG. 5, search window 62 includes a search criteria input segment 80 in which the user inputs search criteria that may be used by the selected database manager 14 to search for audio and/or video clips. The user can input multiple search criteria which will be saved and may be combined with one another. Search criteria input segment 80 of window 62 includes the following components:

a pull-down menu 82 which offers a selection of logical operators such as "if", "and", "or", etc. Note that FIG. 5 does not show the entire menu 82 but only a currently selected item from menu 82, an attribute selection window 84 in which the user can select which attributes of the clips will be searched, an operator pull down menu 86 in which the user can select an operator such as "is", "after or at the same date", "contains", etc., and a user value window 88 in which the user inputs the value which should be used for the search.

Search window 62 also features a selected search segment 90 in which the search criteria input by the user in search criteria input segment 80 appears. After the user inputs each search criterion in search criteria input segment 80 and clicks on "Add Item" button 92, the inputted search criterion appears in select search segment 90 and is added to the previously inputted criteria, if any, to generate the user inputted search criteria. A "find" button 100, starts the searching process by causing interface layer 37 to send a request over network 16 to the selected database manager 14 to perform the search. Note that once one of database managers 14 performs a search, it sends the search results to interface layer 37 of nonlinear editor 12 over network 16. Upon receiving the search results, the number of clips which were found is displayed in the "Assets found" segment 104. In that case, a "Show Assets" button 106 is activated. (In FIG. 5, this button is shown as being dimmed and therefore deactivated.) The user can click on this button to view the search results.

Figure 6:
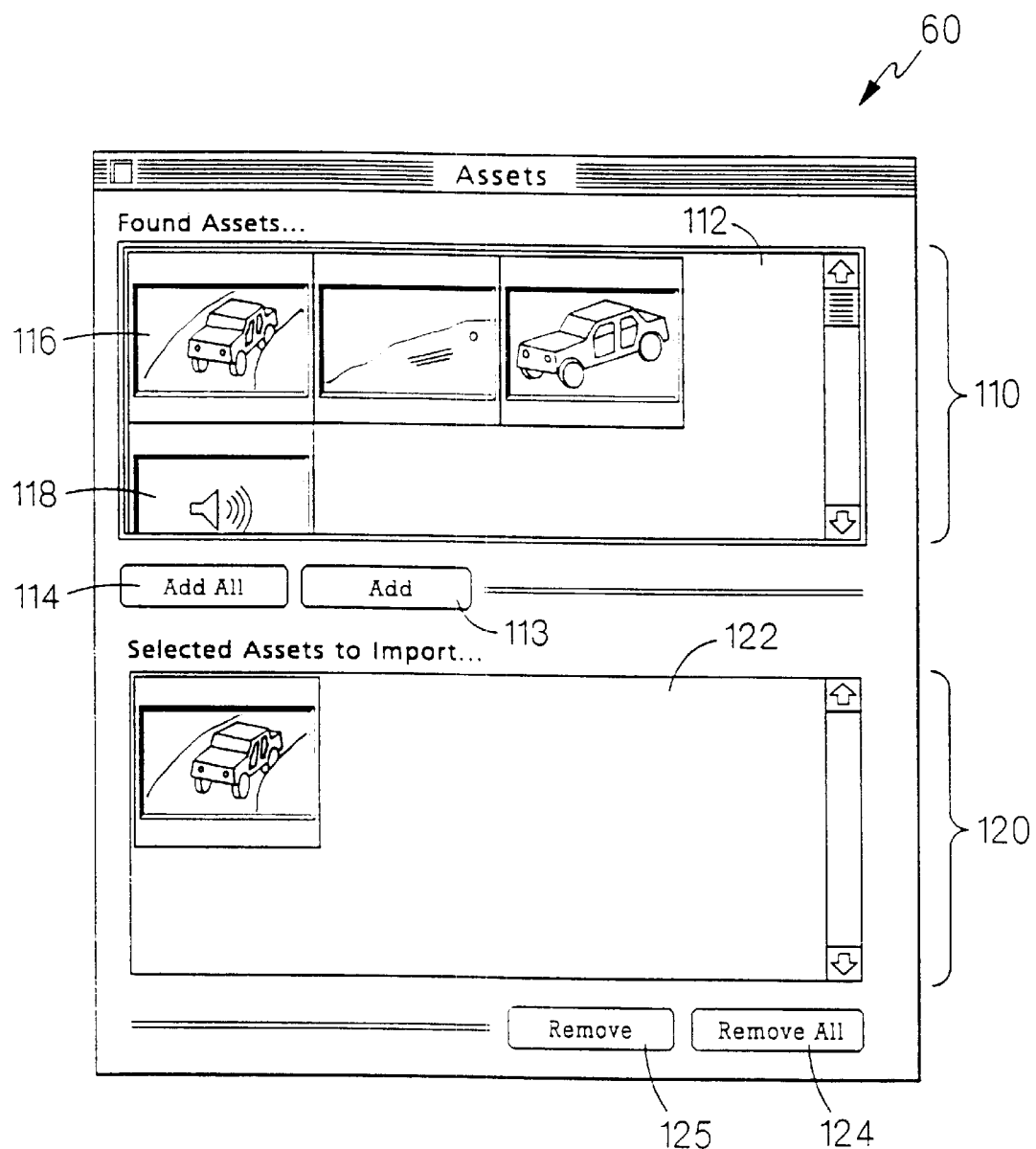
FIG. 6 is a diagram of a graphical user interface window in the display of FIG. 4 for displaying results of searches by the digital database manager of FIG. 2.

Referring to FIG. 6, search result and select window 60 is displayed after the user clicks on the "Show Assets" button 106 in window 62. In other embodiments, search result and select window 60 is automatically displayed when the search is completed. Window 60 displays the results of the search. Window 60 includes a search result segment 110 and a selected clips segment 120. When the user clicks on the "Show Assets" button 106, database manager 14 which performed the search sends to nonlinear editor 12 via interface layer 37 a clip identifier for each clip in the search result. The clip identifiers may be key frames 116 for video clips or descriptions 118 for audio clips. Key frames 116 and descriptions 118 are then displayed in a window 112.

The user can view these clip identifiers and determine which one of the clips the user wants to import from database manager 14 to nonlinear editor 12 over network 16 for editing into the program. Selecting the clip identifiers to be imported proceeds as follows. The user can select any one of the clip identifiers by clicking on the clip identifier to highlight it and then clicking on an "Add" button 113 to add the clip to a window 122 in selected clips segment 120. The user can select all the clips in the search result by clicking on an "Add All" button 114. Similarly, the user can remove a selection from window 122 by first clicking that clip identifier to highlight it and then clicking on a "remove" button 125 so as that the clip is no longer selected to be imported. The user can also remove all of the selected frames by clicking on a "Remove All" button 124. The user may select to import the clips into a selected bin or a default bin. The user may also select that, upon importing a clip, the clip is automatically incorporated into a video program's time line.

Referring back to FIG. 5, after the user has selected at least one clip for importing from database 40, an "Import" button 102 is activated (the button is shown as dimmed and deactivated). The user can click on this button which causes nonlinear editor 12 via interface layer 37 to send a request over network 16 to import the selected clip from the selected database manager 14. The selected database manager 14 then sends a copy of the clip to nonlinear editor 12.

If the requested clip is a video clip, in some embodiments, database manager 14 first decimates the clip and then sends the decimated clip to nonlinear editor 12. We will now describe the operation of decimator 42. As indicated above, the video data is typically stored as compressed video data in databases 40. However, the stored video clips are typically not significantly compressed so as to best preserve their image quality. However, for a variety of reasons, it may not be desirable to send such high quality video data to nonlinear editor 12. For example, it may be that the user requires only low quality images. Or, network 16 may not have high enough bandwidth to support transmission of high quality video clips. Or, it may be that nonlinear video editor 12 does not have enough local storage or processing power, as in the case with a lap-top computer, to support editing of high quality video clips. Therefore, decimator 42 allows decimating the video clip in various ways, which are usually different from the type of compression used for storing the video clip on databases 40, but are better suited for requirements of various applications. Decimator 42 is able to do this because using a decompression stage and a decimator stage divorces the compression technique used for storing the video clip from the decimation technique used to satisfy specific requirements of transmitting or editing the video clip. In this way, decimator 42 allows optimizing the compression technique used for storing video to preserve image quality while optimizing decimation technique used for transmitting the data to meet the requirements set by user preferences, network limitations, or the nonlinear editor's local limitations.

There are generally three basic modes of decimation. First is spatial decimation, where the image is made smaller, as in the case of subframing, subsampling or thumbnailing. Second is temporal decimation, as in when every second frame is skipped. Third is compression, such video compression as in JPEG or MPEG compression algorithms or data compression (which does not necessarily affect the video spatially or temporally but merely compresses the data based on some data compression algorithm). These various modes can be combined in various ways or used singly, depending on the required needs of a particular application. Decimation module 46 can perform these various modes to support a variety of applications.

Figure 9:
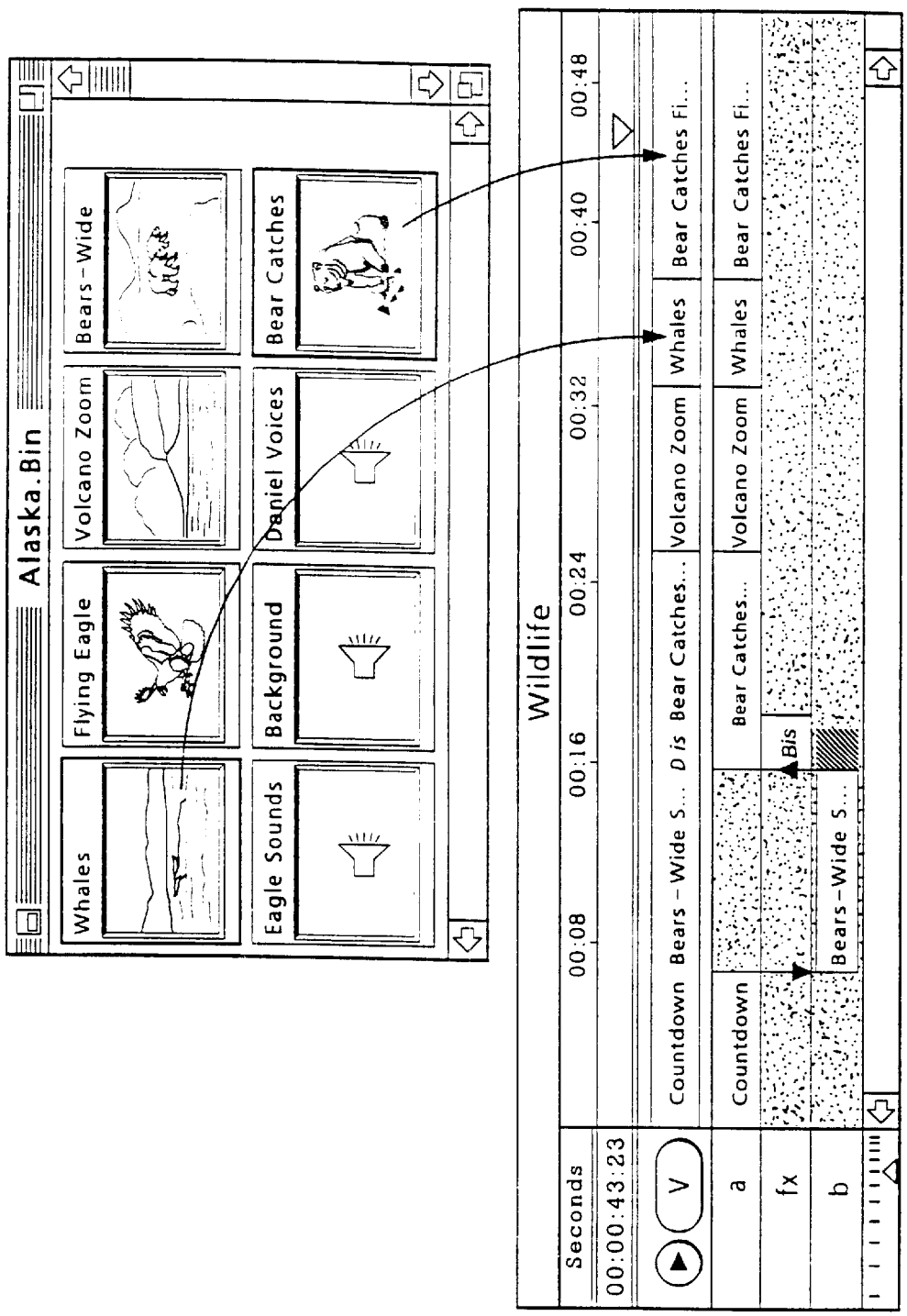
FIG. 9 is a diagram of a display used during creating a program on a monitor of the FIG. 3 nonlinear editor.

The imported clips may be directly incorporated into the program, as will be described below, or be first placed in user selected or default virtual storage units called "bins." Bins are special folders or directories used for organizing video clips. The user can place pointers to various clips stored on local storage in bins and can later use those bins and the pointers in those bins to access the stored video and/or audio clips. For example, the user may use a bin for all clips relating to Alaska, as shown in FIG. 9. (Note that clips in a bin may be then represented in a bin by clip identifiers.)

The imported clip may then be edited and incorporated into an edited program. This process will now be described with reference to FIGS. 7 and 8.

Figure 8:
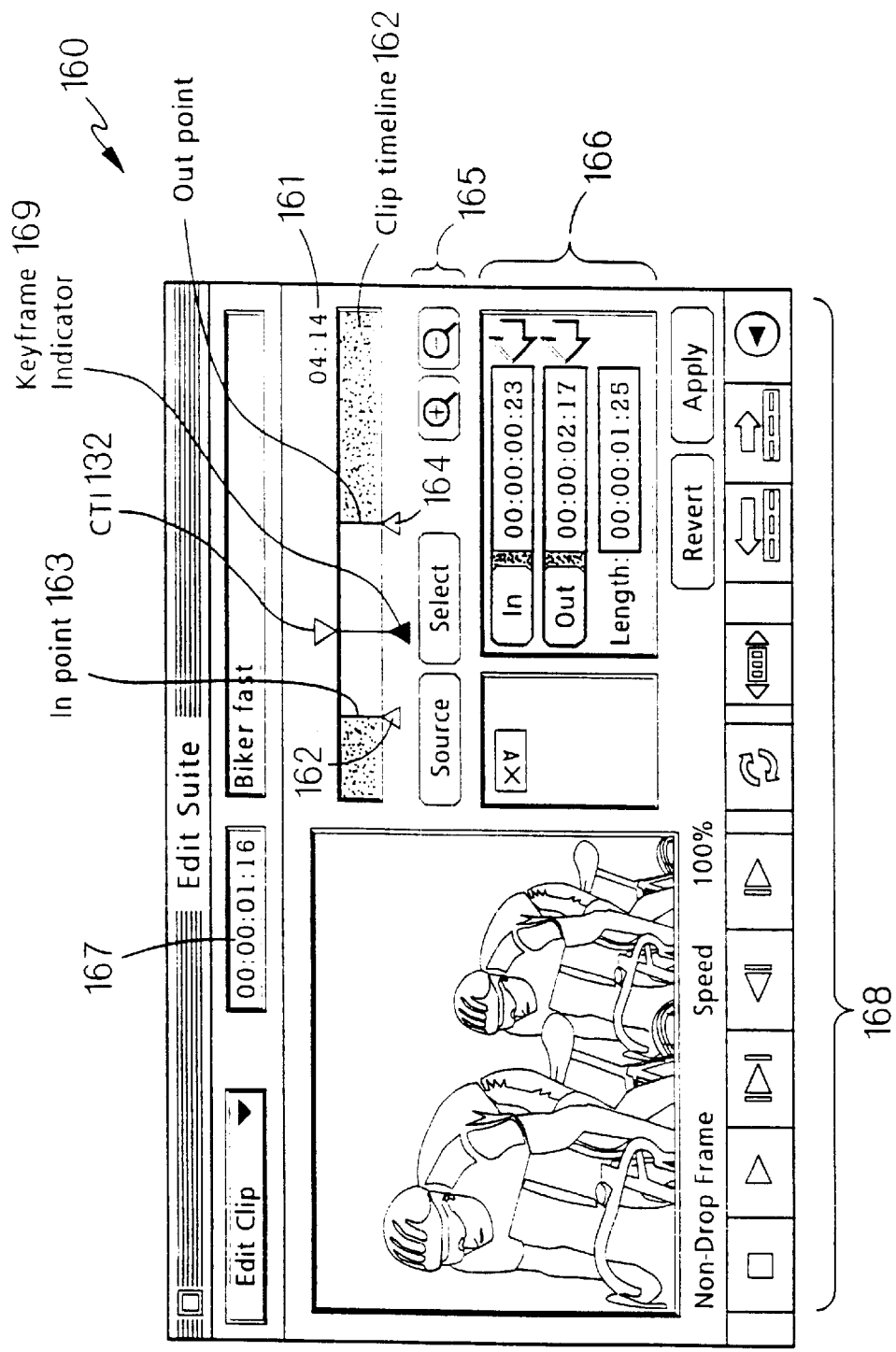
FIG. 8 is a diagram of a display used for editing a video clip on a monitor of the FIG. 3 nonlinear editor.

Program window 50 is the main window used for creating an edited program. Program window 50 features a video time line ruler 130 which shows the time line of the edited program. A current time indicator (CTI) 132 indicates the time code of the current frame displayed in edit window 160 (FIG. 8). A current time code 134 corresponds to the position of CTI 132.

Figure 7:
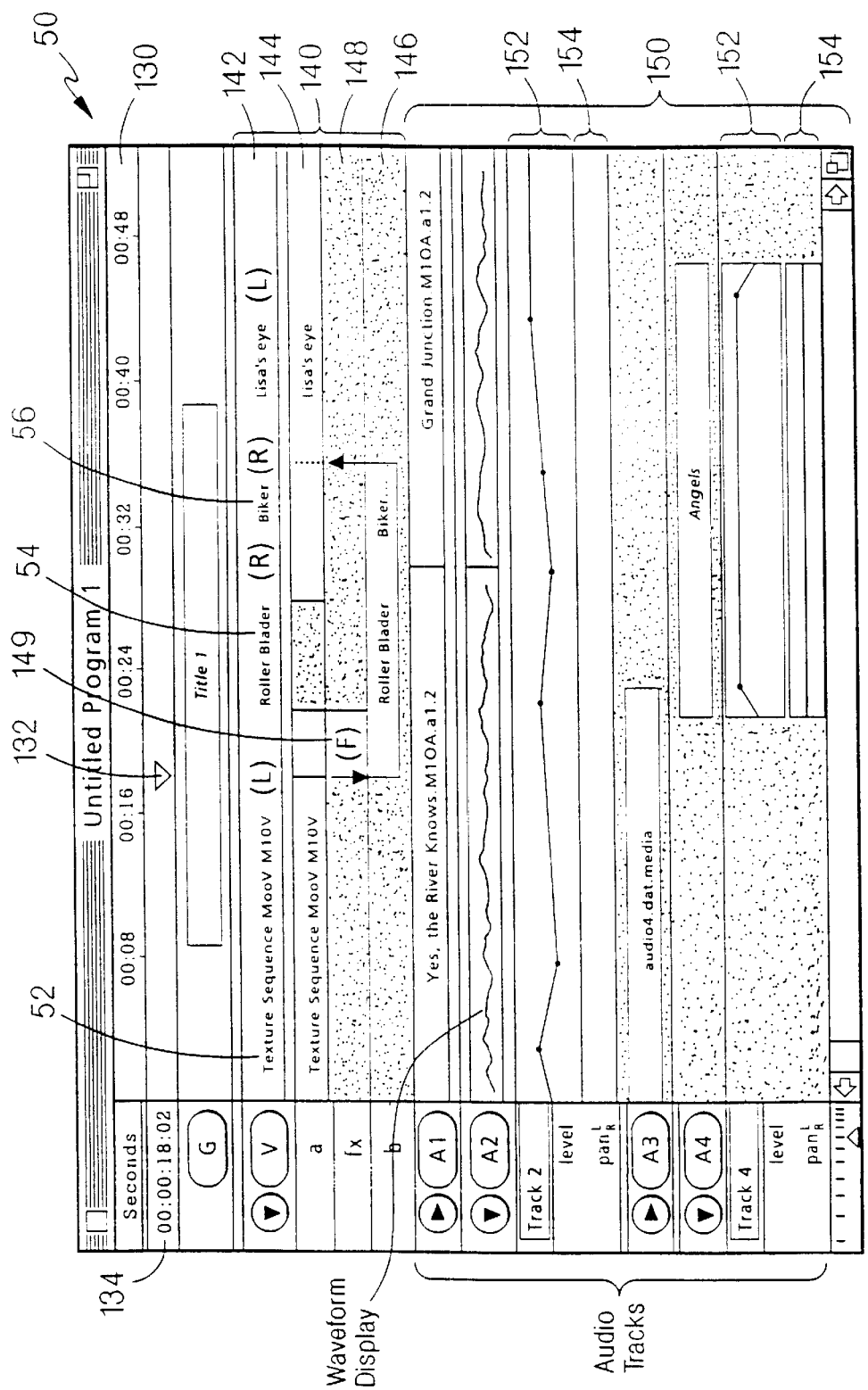
FIG. 7 is a diagram of a graphical user interface window in the display of FIG. 4 for creating an audio and video program.

Program window 50 also features a video specification region 140 and an audio specification region 150. Video specification region 140 has a clip sequence strip 142 that shows the clip name that will be playing at any particular point in the program. In embodiments in which only the decimated clip is imported, a clip to be incorporated into the program may be stored in one of two locations: remotely in databases 40 or locally in media storage of the selected nonlinear editor 12 itself. The selected nonlinear editor 12, when displaying the clip, also displays an indication as to whether the clip is located in the local storage of nonlinear editor or in database 40. To do this, nonlinear editor 12 displays the two clip names differently. In FIG. 7, for example, the clip names are marked with the letter "L" for local and letter "R" for remote. In other embodiments, the clip names may be displayed in different colors.

In the described embodiment, nonlinear editors 12 can support up to two video streams, shown in program window 50 as channel A 144 and channel B 146. Other embodiments may support more video streams, e.g. four. An effects strip 148 shows any particular video effects that will be done at any point in the time line, e.g. fading channel A to channel B as shown by effects time line 149.

Audio specification region shows information for four stereo audio tracks A1–A4 supported by nonlinear editor 12. The four audio tracks may be played simultaneously at varying strength to provide for various combinations of different clips. An example would be track A1 playing a narrative, track A2 playing a background music, track A3 playing the sound track of the video clip at that time line, and track A4 playing the sound of the video clip that is being faded in. An audio clip may be displayed by its description as shown for audio track A1 or by its acoustic wave form as shown for audio track A2. The volume of the audio track and the balance between the left and right stereo channels may be adjusted by a volume adjustment curve 152 and a stereo pan line 154, respectively.

Any clip to be incorporated into the program may be dragged and dropped into program window 50 from a bin, as shown in FIG. 9, or be directly imported from the remote database into the time line. The clips may be inserted, based on the user's choice, into the program at the end of the program or at a point in the time line indicated by the CTI. Referring to FIG. 8, the user can use an edit window 160 to edit the video clip by double clicking on clip name in the time line. Alternatively, the user can double click on a clip in a bin and edit the clip prior to incorporating the clip into the time line.

In edit window 160 (FIG. 8), a clip time line 162 shows the time line of the clip. An in point marker 163 and an out point marker 164 show the beginning and end of the edited segment of the clip to be used in the program. A clip duration indicator 161 displays the duration of the entire clip. The relative time of the in point and out point and the duration of the edited segment are displayed in a time code segment 166. Various buttons 168 at the bottom of window 160, when clicked, cause various functions to be performed by nonlinear editor 12. In window 160, from left to right, these buttons perform the following functions: stop, play, play selected clip from the in point to the out point, frame backward, frame forward, loop, jog/shuffle, next clip and previous clip. A key frame indicator 169 indicates from where in the video clip the key frame is taken. The key frame may be changed by dragging key frame indicator along the clip time line. Zoom buttons 165 cause nonlinear editor to zoom in and out. A time indicator 167 shows where in the time line of the program the clip is inserted.

The net result of the editing is a detailed list of edit instructions with respect to the various audio and video clips. After the user has finalized the program, the user selects from a pull-down menu (not shown) to produce the final program which causes the nonlinear editor to use the detailed instruction list to edit and produce the video and audio clips into the final program. In the case of embodiments where imported clips are decimated, the nonlinear editor retrieves the video clip from the database 40, by requesting the clip from the appropriate database manager 40 over network 16. The retrieved video clip may be decimated for a different video quality or not at all, depending on requirements of a particular application.

In the case where the video clip has been trimmed during editing, the retrieval can be limited to that portion of the video clip to be included in the final program. This reduces the usage of the bandwidth of network 16. In some embodiments, nonlinear editor 12 identifies that portion of a video clip by sending the in point and out point time codes. The appropriate database manager 14 retrieves the appropriate video or audio clip, uses the received in point and out point time codes to select the appropriate segment of the video clip, and then sends that segment over the network to nonlinear editor 12. In other embodiments, the required segment of the video clip is identified by frame numbers assigned by database manager 14 to the frames of the video clip. Database manager 14 then uses the received frame numbers to select the appropriate video frames and sends the selected frames over network 16 to nonlinear editor 12. In some embodiments, the retrieved portion will include additional video at its beginning and end (referred to as "trim handles"). Trim handles allow fading from one clip to another, without shortening the portion of the clip selected by the user to be incorporated into the program.

Having described the various windows used by the user to search, import, and edit audio and video clips to produce an edited program, we will now describe two flow charts of the operation of system 10 with reference to nonlinear editor 12. These flow charts describe only two examples of possible operations of system 10.

Figure 10:
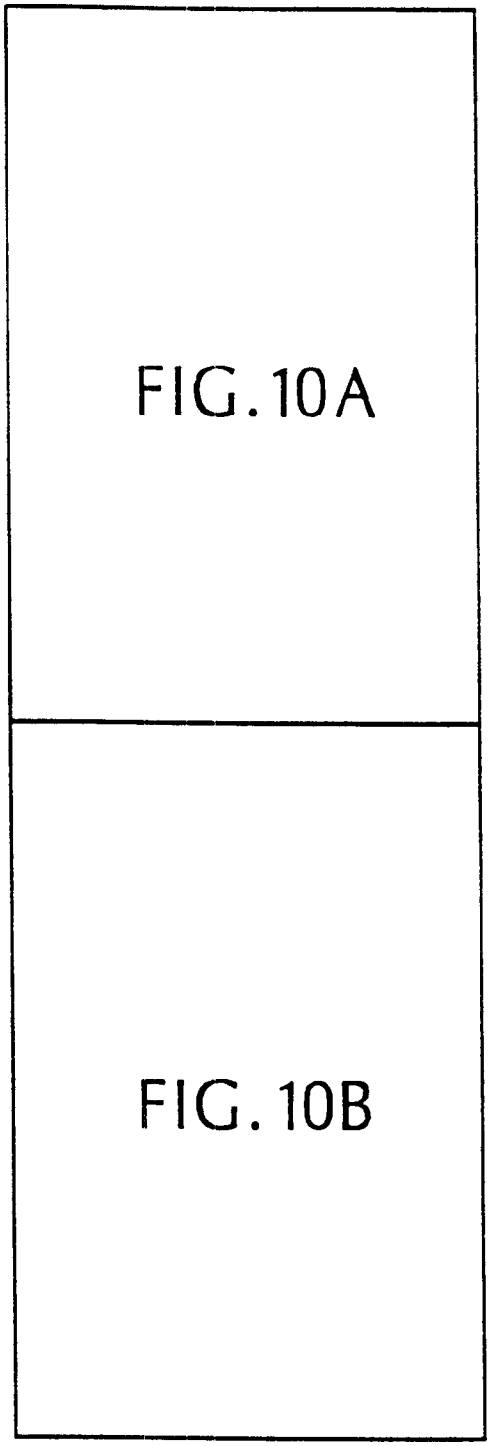
FIG. 10 shows a flow chart of the operation of the system of FIG. 1.
Figure 10A:
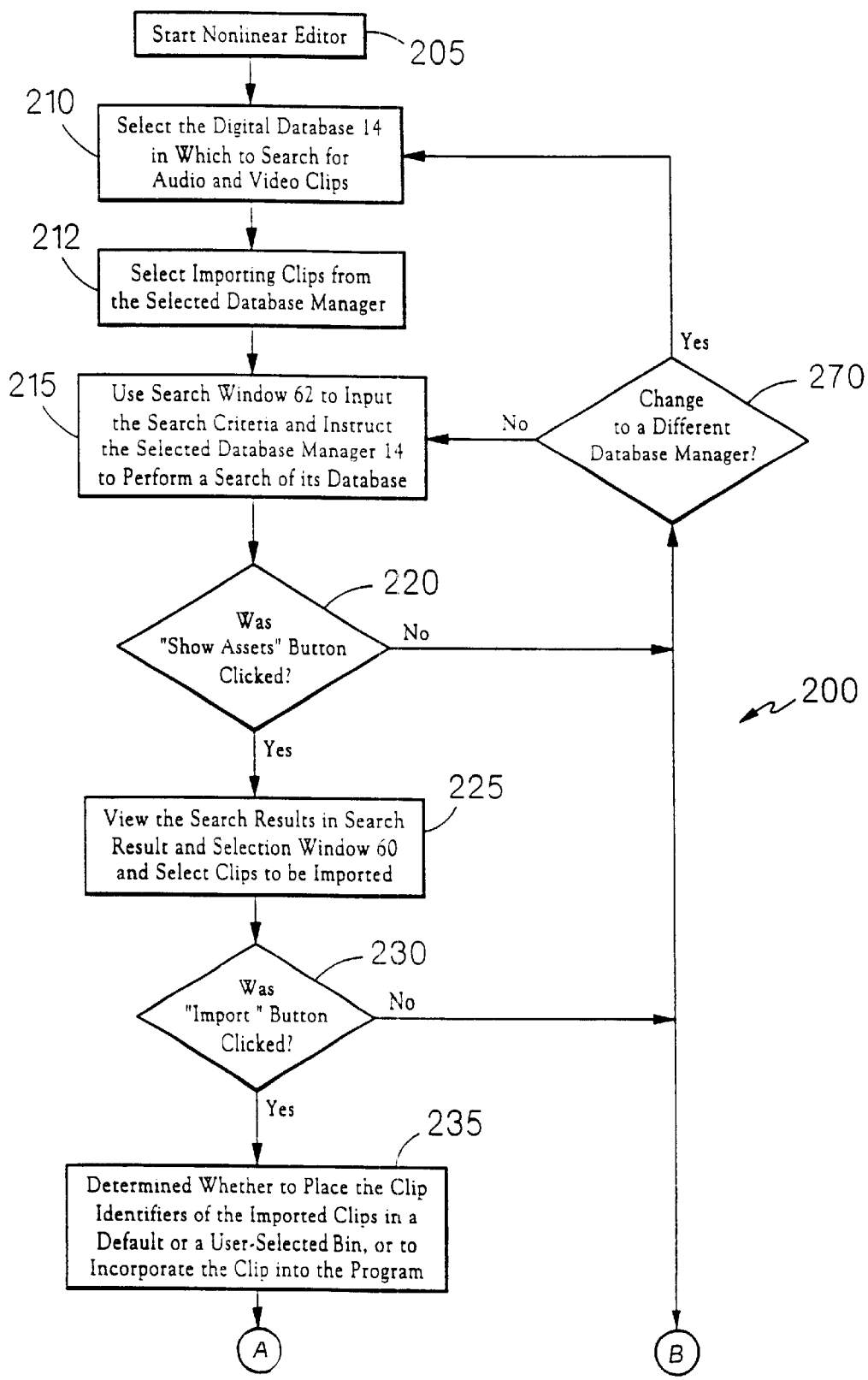
Figure 10B:
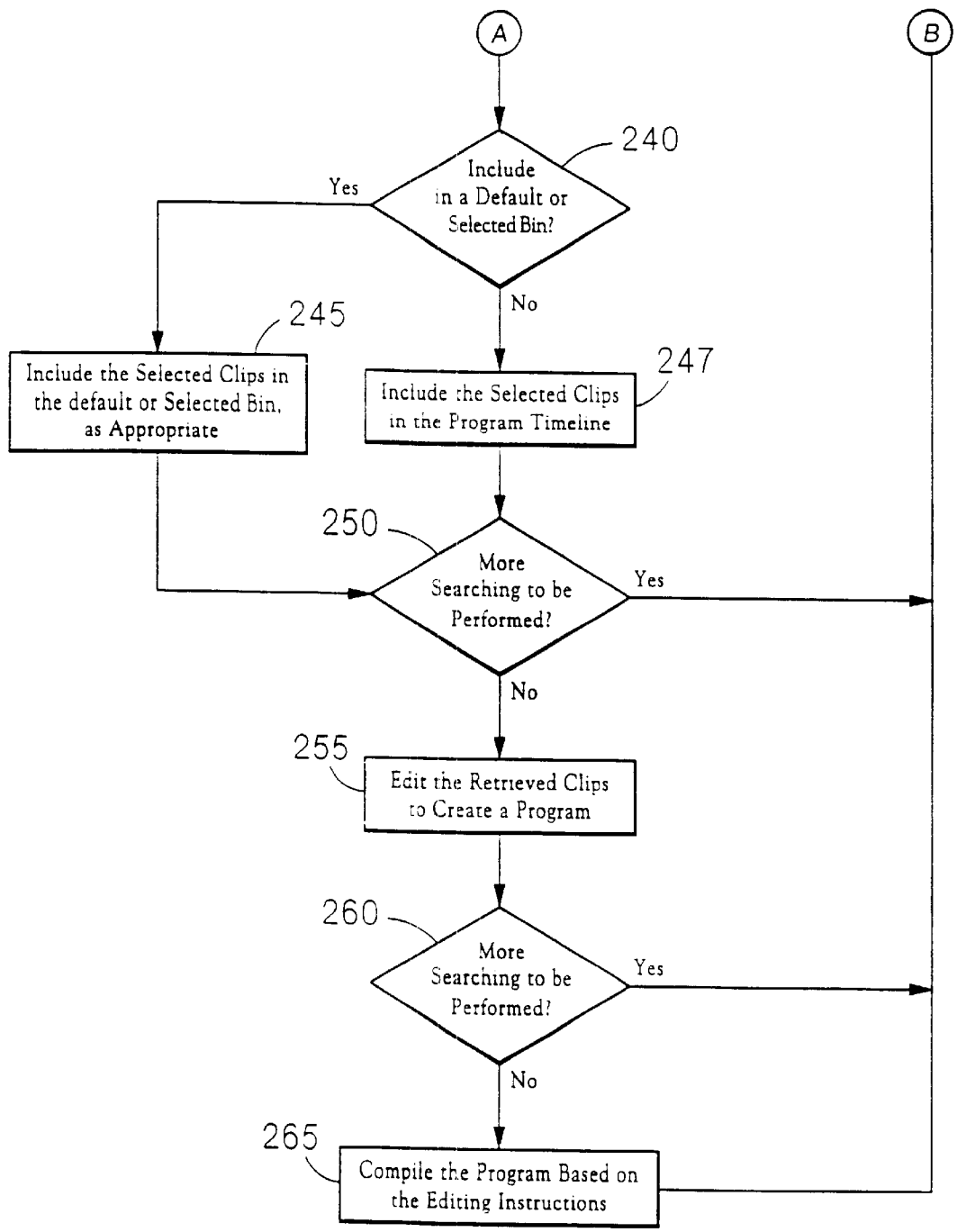

FIG. 10 shows a flow chart 200 of the operation of nonlinear editor 12 when non-decimated clips are imported. In step 205, the user starts the nonlinear editor 12. The user then selects the digital database manager 14 which the user wants to search for audio and video clips (step 210) and then selects, by selecting the appropriate menu item from a pull-down menu (not shown) in window 50, to import clips from that database (step 212). This results in interface layer 37 displaying search window 62. The user then uses search window 62 to input the search criteria and instruct the selected database manager to perform a search of its database (step 215). The user then may use the "Show Assets" button to view the clip identifiers of the clips in the search result and selection window 60 and select the clips to be imported (step 225). If the user clicks on the "Import" button in search window 62 to import clips he or she selected, the selected database manager 14 sends the non-decimated clips over network 16 to nonlinear editor 12 (step 230). Nonlinear editor 12 then determines whether to place the clip identifiers of the imported clips in a default or a user-selected bin, or to incorporate the clip into the program (step 235). To do so, the nonlinear editor determines which is the top most window (i.e. the window most recently used by the user) and imports the clips into that window. If the nonlinear editor determines to include the clips in a selected or default bin (step 240), the nonlinear editor will do so (step 245). If not, the nonlinear editor will incorporate the clip into the time line of the program (step 247). The user may also elect to perform more searching by, for example, clicking on the search window 60 to activate the window (step 250). If not, the user may then edit the retrieved clips to create a program (step 255), also accessing locally stored video clips if desired. During the editing process, the user may elect to perform more searches by, for example, clicking on search window 60 (step 260). The user may also elect to end editing and to produce the finalized program based on the list of editing instructions created in step 260 (step 265). Whenever the user elects to perform more searches (e.g steps 230 and 250), the user may elect to select a different database manager 14 to search (step 270).

Figure 11A:
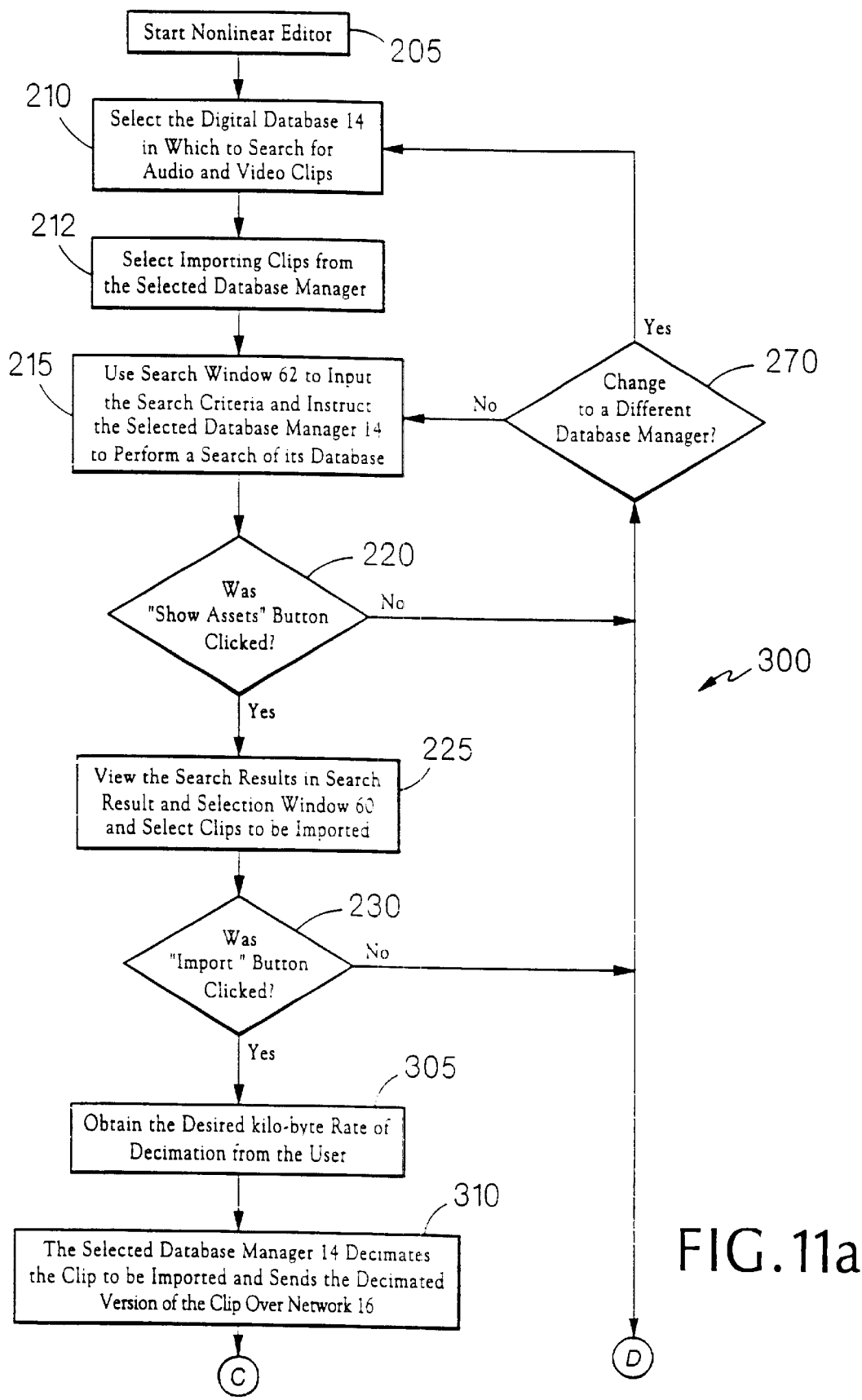
FIG. 11 shows an alternative flow chart for the operation of the system of FIG. 1.
Figure 11B:
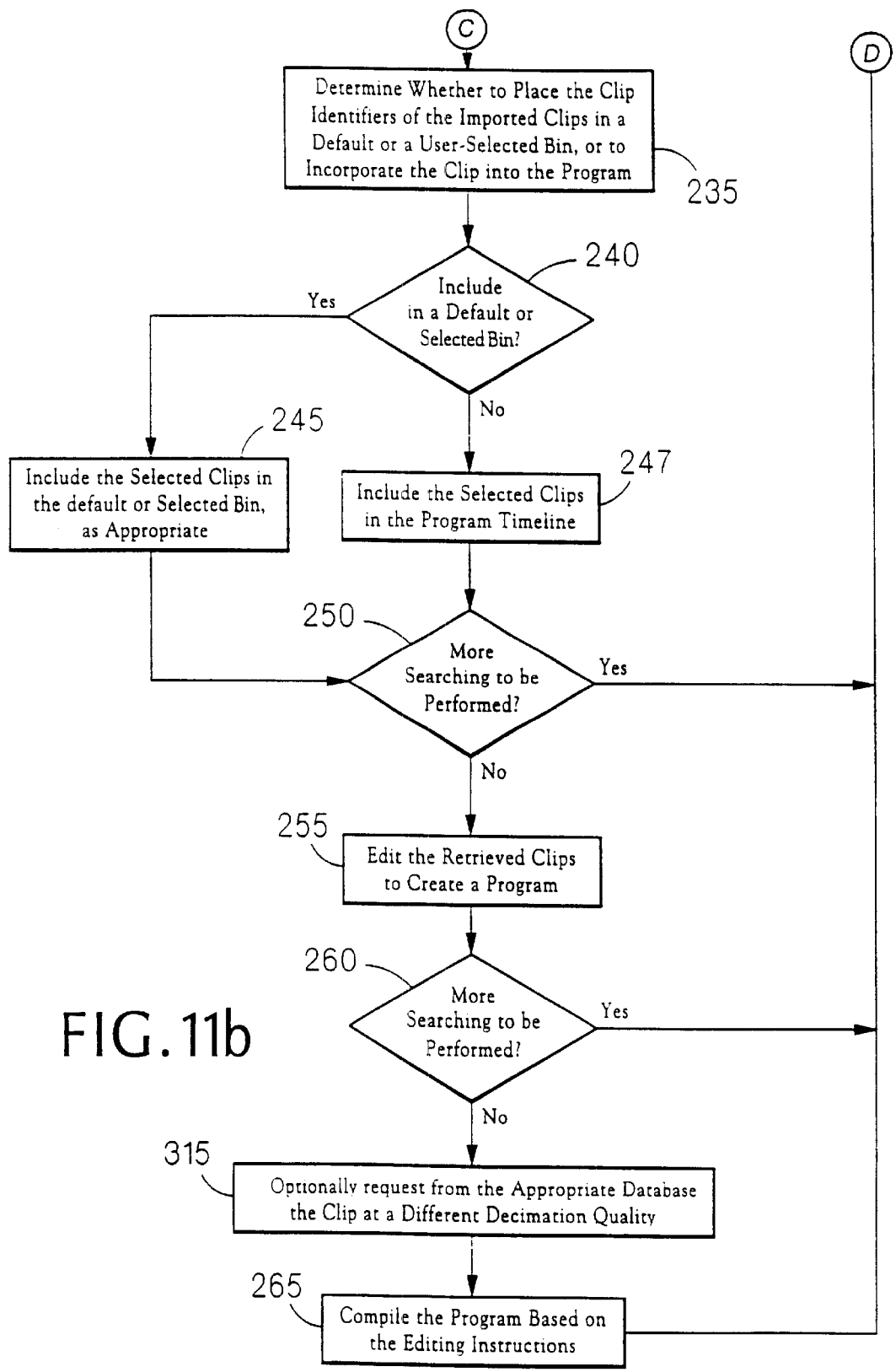

FIG. 11 shows a flow chart 300 of the operation of nonlinear editor 12 when decimated clips are imported from database managers 14. The steps in this flow chart which are the same as flow chart 200 in FIG. 10 are numbered with the same reference numbers. The differences between flow charts 300 and 200 will now be described. Generally, in flow chart 300, when clips are imported they are decimated first. Therefore, in step 305, after the user clicks on the "Import" button in step 230, nonlinear editor 12 asks the user to specify the decimation quality by asking the user to input the desired kilo-byte rate of decimation, that is the number of kilo-bytes one frame of video should be after decimation (step 305). Note that in other embodiments, the decimation quality may be specified in different manners. The selected database manager 14 then decimates the clip to be imported and sends the decimated version of the clip over network 16 to nonlinear editor 12 (step 310) After the user ends editing the program, in the case of clips which nonlinear video editor 12 only has decimated versions of, nonlinear editor 12 may optionally request from the appropriate database managers the clips at a decimation quality (including zero decimation for the data retrieved for the final program, not for the video segments retrieved for editing, which have a reduced amount of data with respect to the stored video segments) different from the previous decimation quality (step 315). In step 315, nonlinear video editor 12 may request that the clips be transmitted in their entirety or that only the appropriate portions of them be transmitted. It should be noted that step 315 is optional, because if the user elects to produce the final program using the already transmitted decimated clips then it is not necessary to request those clips. After completing step 315, nonlinear editor 12 produces the program according to the audio and video editing instructions created during the editing process.

Other embodiments are within the scope of the following claims.

For example, referring to FIGS. 10 and 11, in an alternative embodiment, the user may be required in step 250 to either select the appropriate menu item from a pull-down menu to begin a new search (i.e. go to step 212) or select a new database (i.e. go to step 210) in order to begin a new search.

In other embodiments, digital database system 11 and the nonlinear video editor 12 being used by the user may not be separated by network 16 and may be located on the same computer.

In some embodiments of the invention, digital database managers 14 include an audio resampler. The audio resampler has the ability to resample by, for example, converting the audio clip into an analog signal and then resampling the audio clip. Such a resampler can be used to lower the amount of data representing the audio clip if the sampling rate or the number of bits representing each sampled instance is reduced. Therefore, the audio resampler allows digital database managers 14 to optimize the transmitted audio clips in the same manner as decimator 42 allows digital database managers 14 to optimize the transmitted video clips. The resampled audio clips can then be used in a similar manner as the decimated video clips, as described in the above embodiments. Such an audio resampler provides similar capabilities and advantages with respect to audio clips as the decimator does with respect to video clips. In some embodiments, audio clips may be used by nonlinear media editors, which may for example be audio only editors or video and audio editors, to produce media programs such as audio only or audio and video programs.

What is claimed is:

1. A method of nonlinear video editing comprising storing source video segments on a digital database system, selecting a said source video segment having a stored decimation quality, retrieving said selected source video segment having a stored decimation quality, decimating said selected source video segment into a decimated video segment at a first decimation quality that is more decimated than said stored decimation quality such that said decimated video segment has less data than said source video segment, accessing said decimated video segment at a nonlinear video editor, using said decimated video segment during editing of a video program at said nonlinear video editor, and producing said video program by accessing all or part of said source video segment from said digital database system at a second decimation quality that has more data per frame than said first decimation quality to produce said video program at a less decimated decimation quality than said first decimation quality.

2. The method of claim 1 wherein using said decimated video segment comprises selecting a portion of said decimated video segment.

3. The method of claim 2 wherein accessing said source video segment comprises accessing a corresponding portion of said selected source video segment corresponding to the portion of the decimated video segment.

4. The method of claim 3 wherein accessing said corresponding portion comprises transmitting over a network information identifying the portion of the decimated video segment or the corresponding portion of the selected source video segment to the digital database system and said database system transmitting over the network said corresponding portion of the selected source video segment to the nonlinear video editor.

5. The method of claim 4 wherein said portion of said decimated video segment is characterized by a video segment start time and a video segment end time measured relative to a reference point, wherein said information sent over the network comprises the video segment time and end time of the portion of the decimated video segment, and wherein the digital database system uses the video segment start time and end time of the portion of the decimated video segment to determine the corresponding portion of said source video segment.

6. The method of claim 1 wherein said storing source video segments further comprises compressing the source video segments.

7. The method of claim 6 further comprising decompressing said selected source video segment after said selecting and prior to said decimating.

8. The method of claim 1 wherein decimating said selected video segment comprises at least one of temporally decimating, spatially decimating, or compressing said selected source video segment.

9. The method of claim 1 wherein accessing the decimated video segment comprises transferring said decimated video segment over a network.

10. The method of claim 1 wherein said nonlinear video editor is implemented on a local computer and the video program is produced on said local computer, and wherein the digital database system is located remotely.

11. The method of claim 10 wherein producing said video program includes accessing all or part of said source video segment from said digital database system to produce said video program at a selected decimation quality.

12. The method of claim 11 wherein said selected decimation quality includes a different decimation quality than said first mentioned quality.

13. The method of claim 11 wherein accessing said selected source video segment comprises transmitting over a network information identifying the selected source video segment to the digital database system and said digital database system transmitting over the network said selected source video segment to the nonlinear video editor.

14. The method of claim 13 further comprising receiving the decimated video segment and representing said decimated video in a bin of said nonlinear video editor.

15. The method of claim 13 further comprising receiving the decimated video segment and representing said decimated video segment on a time line of the program on a display.

16. The method of claim 10 wherein editing of the video program comprises editing a plurality of source video segments at least one of which is stored on the local computer.

17. The method of claim 16 wherein at least one of the source video segments stored on said digital database system is visually represented on a display of said nonlinear video editor to indicate that said one of the video segments is stored on said digital database system in contrast to visual representation of said source video segment stored on the local computer indicating said source video segment being stored on the local computer.

18. The method of claim 17 wherein said at least one of the source video segments stored on said digital database system is visually represented by a different color on a display of said nonlinear video editor than said source video segment stored on the local computer.

19. The method of claim 17 wherein said at least one of the source video segments stored on said digital database system is visually represented by a different symbol on a display of said nonlinear video editor than said source video segment stored on the local computer.

20. The method of claim 10 wherein accessing said decimated video segment comprises transmitting said decimated video segment over a network.

21. The method of claim 10 further comprising producing a list of commands when editing the program and using the list of commands to produce said program using the accessed source video segment.

22. The method of claim 1 further comprising obtaining from a user a search criterion for searching said digital database system to find said selected source video segment and searching said digital database system.

23. The method of claim 1 further comprising storing source audio segments on the digital database system, selecting a said source audio segment, resampling, at a selected resampled quality, said selected audio segment into a resampled audio segment, accessing said resampled audio segment, and using said decimated video segment during editing of the video program at said nonlinear video editor.

24. The method of claim 23 wherein producing said video program includes accessing all or part of said source audio segment from said digital database system to produce said video program at a second selected resampled quality.

25. The method of claim 24 wherein the second selected resampled quality is different than said first-mentioned selected resampled quality.

26. Apparatus for editing video comprising a digital database system storing source video segments having a stored decimation quality, said digital database system having the capability to decimate said source video segments into decimated video segments of a first decimation quality that is more decimated than said stored decimation quality such that said decimated video segments have less data than said source video segments, and a nonlinear video editor connected to selectively access said decimated video segments and source video segments from said digital database system and being capable of using said decimated video segments during editing of a video program and producing said video program by accessing all or part of said source video segments from said digital database system at a second decimation quality that has more data per frame than said first decimation quality to produce said video program at a less decimated decimation quality than the first decimation quality.

27. The apparatus of claim 26 wherein the nonlinear video editor is capable of selecting a portion of a decimated video segment.

28. The apparatus of claim 27 wherein the nonlinear video editor accesses a source video segment by accessing a portion of said source video segment corresponding to the portion of the decimated video segment and the digital database system transmits that portion of the source video segment.

29. The apparatus of claim 28 wherein the digital database system and the nonlinear video editor are configured for connection to a network, wherein the nonlinear video accesses said corresponding portion by transmitting over the network information identifying the portion of the decimated video segment or the corresponding portion of the selected source video segment to the digital database system and said digital database system transmits over the network said corresponding portion of the selected source video segment to the nonlinear video editor.

30. The apparatus of claim 29 wherein said portion of said decimated video segment is characterized by a video segment start time and a video segment end time measured relative to a reference point, wherein said information sent over the network comprises the video segment start time and end time of the portion of the decimated video segment, and wherein the digital database system uses the video segment start time and end time of the portion of the decimated video segment to determine the corresponding portion of said source video segment.

31. The apparatus of claim 26 wherein the digital database system stores the source video segments as compressed video segments.

32. The apparatus of claim 31 wherein the digital database system comprises a decompression module for decompressing a compressed source video segment and a decimation module for decimating said decompressed video segment.

33. The apparatus of claim 32 wherein decimating said source video segments comprises at least one of temporally decimating, spatially decimating, or compressing said source video segments.

34. The apparatus of claim 26 wherein the digital database system and the nonlinear video editor are configured for connection to a network, wherein the digital database system transfers a decimated video over the network to the nonlinear video editor.

35. The apparatus of claim 26 wherein the nonlinear video is implemented on a local computer and the digital database system stores the source video segments remotely.

36. The apparatus of claim 35 wherein the nonlinear video editor edits the video program by editing a plurality of source video segments at least one of which is stored on the local computer.

37. The apparatus of claim 36 wherein the nonlinear video comprises a display and the nonlinear video visually represents at least one of the source video segments stored on said digital database system differently on the display of said nonlinear video editor than said source video segment stored on the local computer.

38. The apparatus of claim 37 wherein the nonlinear video visually represents said at least one of the source video segments stored on said digital database system by a different color on the display of said nonlinear video editor than said source video segment stored on the local computer.

39. The apparatus of claim 38 wherein the nonlinear video visually represents said at least one of the source video segments stored on said digital database system by a different symbol on the display of said nonlinear video editor than said source video segment stored on the local computer.

40. The apparatus of claim 35 wherein the digital database system and the nonlinear video editor are configured for connection to a network, wherein the digital database system transmits said decimated video segment over the network.

41. The apparatus of claim 26 wherein the nonlinear video editor is further capable of accessing all or part of said source video segments to produce said video program at a selected decimation quality.

42. The apparatus of claim 41 wherein the selected decimation quality is different than the first-mentioned decimation quality.

43. The apparatus of claim 41 wherein the nonlinear video editor accesses said selected source video segment by transmitting over the network information identifying the selected source video segment to the digital database manager and said digital database system transmits over the network said selected source video segment to the nonlinear video editor.

44. The apparatus of claim 41 wherein the nonlinear video editor includes a bin and receives the decimated video segment and represents said decimated video in said bin.

45. The apparatus of claim 41 wherein the nonlinear receives the decimated video segment and represents said decimated video segment on a time line of the program on a display.

46. The apparatus of claim 41 wherein the nonlinear video editor produces a list of commands when editing the program and uses the list of commands to produce said program using the retrieved source video segment.

47. The apparatus of claim 26 the nonlinear video editor obtains from a user a search criterion for searching said digital database system to find said source video segment.

48. The apparatus of claim 26 wherein said different decimation quality and the selected decimation quality include a quality of a non-decimated video.

49. The apparatus of claim 26 said digital database system further storing source audio segments, said digital database system further having the capability to resample, at a selected resampled quality, said audio segments into resampled audio segments, and the nonlinear video editor connected to selectively access said resampled audio segments and source audio segments from said digital database system and being capable of using said resampled audio segments during editing of a video program and producing said video program.

50. The apparatus of claim 49 wherein the nonlinear video editor is further capable of accessing all or part of said source audio segments to produce said video program at a second selected resampled quality.

51. The apparatus of claim 50 wherein the second selected resampled quality is different than the first-mentioned resampled quality.

52. Apparatus for editing video comprising a remote digital database system storing remote source video segments, said digital database system being configured for connection to a network, and a local nonlinear video editor being configured for connection to said network and comprising a display, said nonlinear video editor having local storage for local source video segments and the ability to access said remote source video segments from said digital database system, said nonlinear video editor displaying on said display video segment identifiers for segments being included in a video program, said identifiers indicating whether the video segments included in the program are remote source video segments or local source video segments.

53. The apparatus of claim 52 wherein the local nonlinear video editor displays on said display the video segment identifiers for the remote source video segments by a different color than the video segment identifiers for the local source video segments.

54. The apparatus of claim 53 wherein said local nonlinear video editor displays on said display the video segment identifiers for the remote source video segments by a different symbol than the video segment identifiers for the local source video segments.

55. A method for editing video comprising storing remote source video segments at a remote digital database system, said digital database system being configured for connection to a network, and displaying, on a display of a local nonlinear video editor, video segment identifiers for segments being included in a video program, said local nonlinear video editor being configured for connection to said network, said nonlinear video editor having local storage for local source video segments and the ability to access said remote source video segments from said digital database system, wherein said video segments being included in said video program comprise video segments selected among said remote and local source video segments, wherein said identifiers indicate whether the video segments included in the program are remote source video segments or local source video segments.

56. Apparatus for editing video comprising
a remote digital database system storing remote source video segments, said digital database system being configured for connection to a network, and
a local nonlinear video editor being configured for connection to said network and comprising a display, said nonlinear video editor having local storage for local source video segments and the ability to access said remote source video segments from said digital database system, said nonlinear video editor displaying on said display a first graphical user interface (GUI) including video segment identifiers for video segments being included in a video program substantially simultaneously with displaying a second GUI including a search mechanism for searching said remote source video segments and displaying remote video segment identifiers found in a search for selection for inclusion in said program by moving one of the remote video identifiers from the second GUI to the first GUI.

57. The apparatus for editing video of claim 56 wherein said local nonlinear video editor displays the video segment identifiers on said display in a video program editing region, where said video program editing region is used for editing said program.

58. The apparatus for editing video of claim 57 wherein said local nonlinear video editor displays on said display a video time line indicator in said program editing region.

59. The apparatus for editing video of claim 56 wherein said local nonlinear video editor uses at least one channel of video and displays on said display a video segment track in said program editing region corresponding to said at least one channel of video.

60. The apparatus for editing video of claim 56 wherein said local nonlinear video editor uses at least one channel of audio and displays on said display an audio segment track in said program editing region corresponding to said at least one channel of audio.

61. The apparatus for editing video of claim 56 further comprising a plurality of remote digital database systems from among which said first-mentioned remote digital database system is selected, wherein said search mechanism includes a remote digital database system selection region for selecting said first-mentioned remote digital system from among said plurality of remote digital database systems.

62. The apparatus for editing video of claim 56 wherein said search mechanism includes a database search region for inputting search criteria for searching said remote digital database system and displaying a search result indicator.

63. The apparatus for editing video of claim 62 wherein said database search region further includes a search criteria input region, wherein said database search region is used for inputting search criteria for searching said remote digital database system.

64. The apparatus for editing video of claim 62 wherein said search result indicator comprises an indication of the number of remote source video segments found in the search.

65. The apparatus for editing video of claim 56 wherein said search mechanism includes a found remote source video segments region for displaying video segment indicators for remote source video segments found in a search performed by said remote digital database system.

66. The apparatus for editing video of claim 65 wherein one of said video identifiers comprises a frame from a corresponding found remote source video segment found in the search.

67. The apparatus for editing video of claim 56 wherein results of a search performed by said remote digital database system are placed in a bin.

68. The apparatus for editing video of claim 67 wherein said results include segment identifiers for video segments found in said search.

69. The apparatus for editing video of claim 56 wherein a remote source video segment found in a search performed by said remote digital database system is sent by said remote digital database system to said local nonlinear video editor and said local nonlinear video editor directly incorporates said remote source video segment in said program upon receiving said segment.

70. The apparatus for editing video of claim 69 wherein remote source video segment is incorporated into said program at a pre-selected point in a time line of said program.

71. The apparatus for editing video of claim 56 wherein the remote digital database system further stores remote source audio segments, said local nonlinear video editor having local storage for local source audio segments and the ability to access said remote source audio segments from said digital database system, said local nonlinear video editor displaying on said display audio segment identifiers for video segments being included in a video program substantially simultaneously with displaying a search mechanism for searching said remote source audio segments for selection for inclusion in said program.

72. The apparatus for editing video of claim 71 wherein results of a search performed by said remote digital database system are placed in a bin.

73. The apparatus for editing video of claim 72 wherein said results include segment identifiers for audio segments found in said search.

74. The apparatus for editing video of claim 73 wherein a remote source audio segment found in a search performed by said remote digital database system is sent by said remote digital database system to said local nonlinear video editor and said local nonlinear video editor directly incorporates said remote source audio segment in said program upon receiving said segment.

75. The apparatus for editing video of claim 74 wherein remote source audio segment is incorporated into said program at a pre-selected point in a time line of said program.

76. A method for editing video comprising
storing remote source video segments at a remote digital database system, said digital database system being configured for connection to a network, and
displaying, on a display of a nonlinear video editor video, a first graphical user interface (GUI) including video segment identifiers for video segments being included in a video program substantially simultaneously with displaying a second GUI including a search mechanism for searching said remote source video segments and displaying remote video segment identifiers found in a search for selection for inclusion in said program by moving one of the remote video identifiers from the second GUI to the first GUI, said local nonlinear video editor being configured for connection to said network, and said nonlinear video editor having local storage for local source video segments and the ability to access said remote source video segments from said digital database system, wherein said video segments being included in said video program comprise video segments selected among said remote and local source video segments.

77. Apparatus comprising a digital database system storing source audio segments, said digital database system having the capability to resample, at a selected resampled quality, said audio segments into resampled audio segments, and a nonlinear media editor connected to selectively access said resampled audio segments and source audio segments from said digital database system and being capable of using said resampled audio segments during editing of a program and producing said program.

78. The apparatus of claim 77 wherein the nonlinear media editor comprises a nonlinear video editor.

79. The apparatus of claim 77 wherein the nonlinear media editor comprises a nonlinear audio editor.

80. The apparatus of claim 77 wherein the nonlinear editor is further capable of accessing said source audio segments to produce said program at a second selected resampled quality.

81. The apparatus of claim 80 wherein the second selected resampled quality is different than the first-mentioned selected resampled quality.

82. The apparatus of claim 80 wherein the nonlinear media editor is capable of selecting a portion of a resampled audio segment.

83. The apparatus of claim 82 wherein the nonlinear video editor accesses a source audio segment by accessing a portion of said source audio segment corresponding to the portion of the resampled audio segment and the digital database system transmits that portion of the source audio segment.

84. The apparatus of claim 83 wherein the digital database system and the nonlinear media editor are configured for connection to a network, wherein the nonlinear media editor accesses said corresponding portion by transmitting over the network information identifying the portion of the resampled audio segment or the corresponding portion of the selected source audio segment to the digital database system and said digital database system transmits over the network said corresponding portion of the selected source audio segment to the nonlinear media editor.

85. The apparatus of claim 84 wherein said portion of said resampled audio segment is characterized by a relative audio segment start time and a relative audio segment end time, wherein said information sent over the network comprises the relative audio segment start time and end time of the portion of the resampled audio segment, and wherein the digital database system uses the relative audio segment start time and end time of the portion of the resampled audio segment to determine the corresponding portion of said source audio segment.

86. A method comprising storing source audio segments on a digital database system, selecting a said source audio segment, resampling, at a selected resampled quality, said selected audio segment into a resampled audio segment, accessing said resampled audio segment, and producing said program.

87. The method of claim 86 wherein producing said program includes accessing said source audio segment from said digital database system to produce said program at a second selected resampled quality.

88. The method of claim 87 wherein said second selected resampled quality includes a different resampled quality than said first-mentioned resampled quality.

\* \* \* \* \*